(12) United States Patent
Han et al.

(10) Patent No.: US 10,475,592 B2
(45) Date of Patent: Nov. 12, 2019

(54) COMPOSITION AND METHOD FOR FORMING ELECTROACTIVE COATING COMPRISING CONJUGATED HETEROAROMATIC POLYMER, CAPACITOR AND ANTISTATIC OBJECT COMPRISING THE ELECTROACTIVE COATING, AND SOLID ELECTROLYTIC CAPACITOR AND METHOD FOR FABRICATING THE SAME

(71) Applicant: PolyM technology corporation, Hsinchu (TW)

(72) Inventors: Chien-Chung Han, Hsinchu (TW); Ting-Chia Ku, Taichung (TW); Jo-Wen Chiang, Taichung (TW)

(73) Assignee: PolyM technology corporation, Hsinchu (TW)

( * ) Notice: Subject to any disclaimer, the term of this patent is extended or adjusted under 35 U.S.C. 154(b) by 0 days.

(21) Appl. No.: 15/428,122

(22) Filed: Feb. 8, 2017

(65) Prior Publication Data

US 2017/0148578 A1    May 25, 2017

Related U.S. Application Data

(60) Division of application No. 14/306,251, filed on Jun. 17, 2014, now Pat. No. 9,627,147, which is a
(Continued)

(51) Int. Cl.
*H01G 9/15* (2006.01)
*H01G 9/00* (2006.01)
(Continued)

(52) U.S. Cl.
CPC ............ *H01G 9/15* (2013.01); *C08G 61/125* (2013.01); *C08G 61/126* (2013.01);
(Continued)

(58) Field of Classification Search
CPC ..... H01B 1/127; C08G 73/0611; C08G 75/00
See application file for complete search history.

(56) References Cited

U.S. PATENT DOCUMENTS

2004/0085711 A1*  5/2004  Merker ............... C08G 61/126
                                                                361/523
2007/0270571 A1*  11/2007  Reynolds ............ C08G 61/124
                                                                528/373
(Continued)

*Primary Examiner* — Mark S Kaucher
(74) *Attorney, Agent, or Firm* — JCIPRNET

(57) ABSTRACT

A composition for forming an electroactive coating is described, including an acid as a polymerization catalyst, at least one functional component, and at least one compound of formula (1) as a monomer:

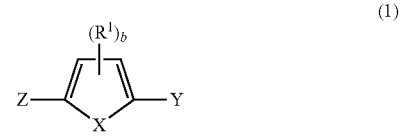

(1)

wherein X is selected from S, O, Se, Te, $PR^2$ and $NR^2$, Y is hydrogen (H) or a precursor of a good leaving group $Y^-$ whose conjugate acid (HY) has a $pK_a$ of less than 30, Z is hydrogen (H), silyl, or a good leaving group whose conjugate acid (HY) has a $pK_a$ of less than 30, b is 0, 1 or 2, each $R^1$ is a substituent, and the at least one compound of formula (1) includes at least one compound of formula (1) with Z=H and Y≠H.

23 Claims, 2 Drawing Sheets

Related U.S. Application Data continuation-in-part of application No. 13/662,533, filed on Oct. 28, 2012, now Pat. No. 9,790,330.

(51) Int. Cl.
    *C08G 61/12*     (2006.01)
    *C08G 73/06*     (2006.01)
    *H01B 1/12*     (2006.01)
    *C09D 179/04*     (2006.01)
    *C09D 5/08*     (2006.01)
    *C09D 5/24*     (2006.01)

(52) U.S. Cl.
    CPC .......... *C08G 73/0611* (2013.01); *C09D 5/086* (2013.01); *C09D 5/24* (2013.01); *C09D 179/04* (2013.01); *H01B 1/127* (2013.01); *H01B 1/128* (2013.01); *H01G 9/0036* (2013.01); *C08G 2261/145* (2013.01); *C08G 2261/1412* (2013.01); *C08G 2261/3221* (2013.01); *C08G 2261/3222* (2013.01); *C08G 2261/3223* (2013.01); *C08G 2261/94* (2013.01)

(56) References Cited

U.S. PATENT DOCUMENTS

2009/0014693 A1\*   1/2009   Zahn .................... C07D 517/04
                                                                       252/510
2017/0183512 A1\*   6/2017   Han ........................ C09D 5/24

\* cited by examiner

COMPOSITION AND METHOD FOR FORMING ELECTROACTIVE COATING COMPRISING CONJUGATED HETEROAROMATIC POLYMER, CAPACITOR AND ANTISTATIC OBJECT COMPRISING THE ELECTROACTIVE COATING, AND SOLID ELECTROLYTIC CAPACITOR AND METHOD FOR FABRICATING THE SAME

CROSS-REFERENCE TO RELATED APPLICATION

This application is a divisional application of and claims the priority benefit of U.S. patent application Ser. No. 14/306,251, filed on Jun. 17, 2014, now allowed, which is a continuation-in-part application of U.S. patent application Ser. No. 13/662,533, filed on Oct. 28, 2012, now pending. The entirety of each of the above patent applications is hereby incorporated by reference herein and made a part of this specification.

BACKGROUND OF THE INVENTION

Field of Invention

This invention relates to conducting polymers, their preparation and their applications, and more particularly relates to a method for forming a conjugated heteroaromatic polymer, to a conjugated heteroaromatic homopolymer or copolymer formed by the method, to a composition for forming an electroactive coating comprising a conjugated heteroaromatic polymer, to a capacitor or an anti-static object comprising the electroactive coating prepared from the composition, to a method for forming an electroactive coating using the composition, to a capacitor or an anti-static object comprising the electroactive coating prepared from the coating forming method, to a method for fabricating a solid electrolytic capacitor using the coating forming method, and to a solid electrolytic capacitor that is fabricated using the fabrication method.

Description of Related Art

During the past few decades, backbone-conjugated conducting polymers, such as polyacetylenes, polyanilines, polyaromatics, polyheteroaromatics, poly(aromatic vinylene)s and poly(heteroaromatic vinylene)s, have raised great research interests in both industrial and academic communities, because of their great application potentials and their novel electronic, optical, electrooptical, and opto-electronic properties. Conducting polymers have been demonstrated to have great potentials for many important applications, such as antistatic, ESD, EMI-shielding, cable-shielding, radar-shielding, high frequency capacitor, rechargeable battery, anti-corrosion, gas separation membranes, smart window, chemical sensor, bio-sensor, solar cell, light-emitting diode, electrochromic display, field effect transistor, organic memory device, lithography, via-hole electroplating, and nonlinear optical materials.

Among the conjugated conducting polymers, polyheteroaromatics and particularly polythiophenes have attracted great attentions recently due to their easier processability and better thermal stability. Regarding the conventional methods, most of the polyheteroaromatics have been synthesized from heteroaromatics via oxidative polymerization either electrochemically or chemically. For example, U.S. Pat. No. 4,697,001 discloses synthesis of polypyrrole from pyrrole via oxidative chemical polymerization using metal-containing oxidant, such as $FeCl_3$ or $Fe(OTs)_3$.

Polythiophenes have been in general prepared either from 2,5-unsubstituted thiophenes or from 2,5-dihalogenated thiophenes. For example, polythiophene can be prepared from thiophene using metal-containing oxidants such as $FeCl_3$, $MoCl_5$, and $RuCl_3$ (*Jpn. J. Appl. Phys.* 1984, 23, L899), or from 2,5-dibromothiophene via metal-catalyzed polycondensation polymerization using the combined reagent of Mg metal and Ni(0) catalyst (U.S. Pat. No. 4,521,589). Recently, the metal-catalyzed polycondensation method has been modified by many research groups, such as Reike's and McCullough's, for making regioregular poly(3-substituted thiophenes) from 3-substituted 2,5-dibromo-thiophenes using various combination of metal-containing reagents: such as Li/naphthalene/$ZnCl_2$/Ni(II) or Pd(0) complex (U.S. Pat. No. 5,756,653), organomagnesium reagent/Ni(II)-complex (U.S. Pat. No. 6,166,172), organomagnesium reagent/$ZnCl_2$/Ni(II)-complex (U.S. Pat. No. 7,572,880), and organomagnesium reagent/$MnCl_2$/Ni(II) complex (US 2010/0234478A1).

Up to now, there is only one reported prior method of preparing polythiophene from 2-bromothiophenes (U.S. Pat. No. 6,602,974). For example, McCullough indicated that the above regioregular poly(3-substituted thiophenes) can also be made from 3-substituted 2-bromo-thiophene via a three-step reaction by treating the monomer in the first step with a strong base LDA (lithium diisopropylamine, prepared freshly from the reaction of diisopropylamine with n-butyl lithium) under cryogenic temperatures at −40° C. for 40 minutes, followed by the addition of $MgBr_2$ at −60° C. for about 1 hour in the second step, and then by the addition of Ni(II)-complex at −5° C. in the third step, and finally allowed the reaction to proceed at room temperature for additional 18 hours.

All the above mentioned prior methods have encountered the disadvantage of being contaminated with substantial amount of metal impurities that can cause detrimental effects to the optimal performance, long term stability, and the lifetime of their application articles and devices. Furthermore, most of the conventional methods involve use of either a strong base (such as organolithium reagent, organomagnesium reagent, and LDA) or a reactive metal (such as activated Zn metal, Mg metal, and Li metal), or in some cases the use of both reagents. These reagents are reactive toward the monomers that contain a proton group having a $pK_a$ value of less than about 40 (such as S—H, O—H, N—H, acetylenic proton, α-hydrogen to a carbonyl group or to other electron-withdrawing group, and all the C—H groups except those of alkyl, alkoxy, phenyl, and vinyl) and also reactive toward electrophilic functional groups (such as carbonyl, carbonate, nitrile, imino, nitro, nitroso, sulfoxide, sulfinyl, and sulfonyl, phosphonyl, phosphinyl, epoxy, alkyl halide, and other similar groups).

Such reactivity will cause great limitations on the allowable functional groups appearing on the thiophene monomers. Similar limitations would also occur to the conventional chemical oxidative polymerization method, wherein the employed strong oxidant causes the undesirable oxidation side reactions to some of the functional groups. The high reactivity of both the above strong base and active metal will also greatly limit the applicable reaction and/or processing solvent media. These strong bases and reactive metals are also in general moisture- and air-sensitive, which requires the use of expensive and complicated production apparatus, facility, handling and manufacturing process.

These reactive reagents also cast great industrial potential hazards. In addition, the above methods often involve the use of either the cryogenic temperatures (such as −40° C. to −78° C.) or the reflux temperatures for long hours, which would further increase the production costs and energy consumptions. Further, these transition metal complexes are not only very expensive but also environmentally concerned.

Though a specific polythiophene derivative, poly(3,4-ethylenedioxythiophene) (PEDOT), has been prepared via a catalyst-free solid-state oxidative polymerization by heating the solid crystals of 2,5-dibromo-3,4-ethylenedioxythiophene (DBEDOT) as a monomer at some elevated temperatures below its melting temperature (96-97° C.), as described in *J. Am. Chem. Soc.* 2003, 125, 15151-15162, the same polymerization did not proceed in its melt or solution state. Such solid-state polymerization method is also only applicable to limited cases due to its unique requirements for the steric arrangement between two neighboring dihalogenated monomers within the crystal. In the same report, they had also found that the addition of protonic acid catalyst (such as HBr) did not lead to any changes to the dibromo-monomer (see the footnote 24 thereof).

On the other hand, U.S. Pat. No. 6,891,016 discloses that in presence of protonic acid or Lewis acid, non-brominated 3,4-ethylenedioxythiophene (EDOT) changes significantly to yield an equilibrium reaction mixture that contains unreacted monomer (~50%) and non-conjugated dimeric and trimeric thiophenes (~50%), instead of polymers. Though U.S. Pat. No. 7,951,901 discloses that the mixture of EDOT and DBEDOT can somehow undergo polymerization in presence of protonic acid or Lewis acid, the polymerization requires heating at high temperatures (80-90° C.) for long time (5-11 h) and only gives PEDOT in a poor yield (40-60%) with a rather low conductivity of $10^{-2}$-$10^{-7}$ S/cm. Furthermore, this method is only applicable to 3,4-dialkoxy-substituted thiophenes.

Thus, there is a great need for an effective, energy saving, and environmentally friendly method for making polythiophenes and polyheteroaromatics in general.

While, regarding the applications of conductive polymer, U.S. Pat. No. 4,803,596 discloses that a conductive polymer may be used as the solid electrolyte of a solid electrolytic capacitor. In the method, the positive foil of an electrolytic capacitor is dripped with a monomer solution and an oxidant solution sequentially, and the monomer is polymerized by the oxidant under proper condition. However, because the conductive polymer monomer is not fully and homogeneously mixed with the oxidant, the reaction and the resultant coating are not uniform.

U.S. Pat. No. 4,910,645 discloses that a series of specific polythiophenes can apply to the electrolyte of solid state electrolytic capacitors. The method includes dipping a capacitor element in a pre-mixed solution of a thiophene monomer and an oxidant and then polymerizing the thiophene monomer at higher temperature. However, the stability of the mixture at room temperature decreases significantly if high concentration of the monomer and/or the oxidant is used. Therefore, the method uses a large amount of solvent to dilute the concentration of the monomer and the oxidant, so only a very little amount of conductive polymer coating forms in every single impregnation-polymerization cycle. Hence, many cycles are required to generate enough amounts of conductive polymer for filling the pores and spaces in the capacitor element.

U.S. Pat. No. 6,056,899 discloses a process that uses a kind of cyclic ether (such as THF) to mix with an Fe(III) oxidant for forming a coordination complex to reduce the oxidation ability of the oxidant so that the mixture solution of the monomer and the oxidant is kept stable. After the capacitor element is impregnated with the mixture, the cyclic ether is evaporated at a higher temperature to release the oxidant for inducing polymerization of the monomer. Since the cyclic ether used in the invention (such as THF) has little ability as a polymerization retardant to stabilize the mixture solution of the monomer and the oxidant, a large amount of such cyclic ether (ca. 40-60 wt %) is employed in order to stabilize the mixture solution, and consequently dilutes the mixture solution. As a result, many impregnation-polymerization cycles (e.g., 12 cycles) are still required to accumulate enough amounts of conductive polymer for filling the pores and spaces in the capacitor element.

SUMMARY OF THE INVENTION

Accordingly, this invention provides an effective, low-cost, environmentally friendly method for forming a conjugated heteroaromatic polymer or copolymer.

This invention also provides a conjugated heteroaromatic polymer or copolymer that can be formed by using the method of this invention.

This invention further provides a composition for forming an electroactive coating.

This invention further provides a method for forming an electroactive coating comprising a conjugated heteroaromatic polymer.

This invention further provides an electroactive coating that is prepared from the composition of this invention or by the coating forming method of this invention.

This invention further provides an application article containing the electroactive coating of this invention, which comprises a conjugated heteroaromatic polymer that is free of transitional metal contaminants or residues. The application article may be a solid electrolytic capacitor, or an antistatic object, etc.

This invention further provides a method for fabricating a solid electrolytic capacitor, which uses the coating forming method of this invention.

This invention further provides a solid electrolytic capacitor that is fabricated using the fabrication method of this invention.

This invention is based on the discovery of the unusual high polymerization reactivity of a heteroaromatic compound bearing with only one leaving group at position 2 or 5 of the heteroaromatic ring.

In a method for forming a conjugated heteroaromatic polymer of this invention, at least one compound of formula (1) is polymerized using an acid as a catalyst,

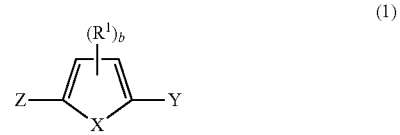

(1)

wherein X is selected from the group consisting of S, O, Se, Te, $PR^2$ and $NR^2$, wherein $R^2$ is selected from the group consisting of hydrogen, and substituted or unsubstituted alkyl, aryl, heteroaryl, alkanoyl, and aryloyl groups. Y is hydrogen (H), or a precursor of a good leaving group $Y^-$ whose conjugate acid (HY) has a $pK_a$ of less than 30. Z is hydrogen (H), silyl, or a precursor of good leaving group $Z^-$ whose conjugate acid (HZ) has a p$K_a$ of less than 30. The value b is 0, 1 or 2. Each $R^1$ is a substituent. When b=2, the two $R^1$ are the same or different and may joint together to form a substituted or unsubstituted aliphatic, aromatic, or heteroaromatic ring, which may include one or more heteroatoms and/or divalent moieties selected from nitrogen, sulfur, sulfinyl, sulfonyl, phosphorus, selenium, ester, carbonyl, oxygen, and so on. The at least one compound of formula (1) being polymerized comprises at least one compound of formula (1) with Z=H and Y≠H.

The inventors also found that an oligomer or polymer formed by polymerizing a compound of formula (1) with Z=H and Y≠H as above also has polymerization reactivity. Accordingly, a derivative method for forming a conjugated heteroaromatic polymer of this invention is provided, wherein at least one compound of formula (2) is polymerized using an acid as a catalyst,

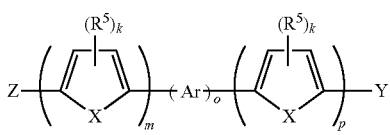

(2)

wherein X, Y and Z are defined as above. Ar is a substituted or unsubstituted, mono- or poly-nuclear, aryl or heteroaryl ring. The values m, o and p are each independently an integer equal to or greater than 0, with a proviso that m+p≥1. Each k is independently 0, 1 or 2. Each $R^5$ is a substituent, wherein any two $R^5$ on the same ring or on two neighboring rings, or $R^5$ and a substituent group on a neighboring Ar ring, may join together to form a substituted or unsubstituted aliphatic, aromatic, or heteroaromatic ring, which may include one or more heteroatoms and/or divalent moieties selected from nitrogen, sulfur, sulfinyl, sulfonyl, phosphorus, selenium, ester, carbonyl, oxygen, and so on. The at least one compound of formula (2) being polymerized comprises at least one compound of formula (2) with Z=H and Y≠H.

In another embodiment of this invention, a compound of formula (2) can also be used as the polymerization promoter for a compound of formula (1). For example, a less reactive compound of formula (1) with Z≠H and Y≠H or with Z=H and Y=H can be first mixed with a small and predetermined amount of a compound of formula (2), following by the addition of the acid catalyst. Owing to the greater conjugation extent and thus the greater electronic density of the compound of formula (2), the acid catalyst will first react with the compound of formula (2) that will then promote the coupling reaction between the compound of formula (2) and the compound of formula (1), thus initiating the polymerization of the compound of formula (1). Moreover, the inventors also found that a less reactive compound of formula (1) selected from the group consisting of compounds of formula (1) with Z≠H and Y≠H and compounds of formula (1) with Z=H and Y=H can also react with an oligomer or polymer that is formed by polymerizing a compound of formula (1) with Z=H and Y≠H to further elongate the polymer chain. Accordingly, it is possible to polymerize a first compound of formula (1) with Z=H and Y≠H first to form a polymer chain, followed by the addition of a second compound of formula (1) with Z=H and Y≠H, Z≠H and Y≠H, or Z=H and Y=H, but with a different combination set of X, $R^1$ and b to further elongate the polymer chain forming a different block and thus to yield a diblock copolymer. Then, the first compound or a third compound of formula (1) with Z=H and Y≠H, Z≠H and Y≠H, or Z=H and Y=H, but having a still different combination set of X, $R^1$ and b can be added to form a further block. Thus, a triblock copolymer with either a A-B-A or a A-B-C structural configuration can be prepared, wherein A, B, C are representing different polymer blocks. Likewise, a multi-block copolymer can be similarly prepared by simply controlling the addition sequence and reaction timing for each different monomeric compound of formula (1).

Accordingly, an embodiment of this invention is a conjugated heteroaromatic block copolymer including a fragment expressed by formula (3):

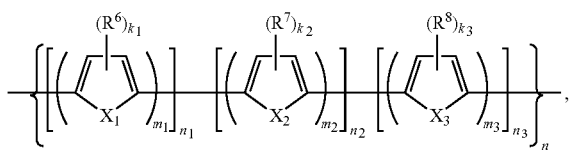

(3)

wherein n is an integer equal to or greater than 1, $m_1$, $m_2$ and $m_3$ are independently integral equal to or greater than 2, and $n_1$, $n_2$ and $n_3$ are independently 1 or 0. $X_1$, $X_2$ and $X_3$ are the same or different, and are independently selected from the group consisting of S, O, Se, Te, $PR^2$ and $NR^2$, wherein $R^2$ is selected from the group consisting of hydrogen, and substituted and unsubstituted alkyl, aryl, heteroaryl, alkanoyl, and aryloy groups. The values $k_1$, $k_2$, $k_3$ are independently 0, 1 or 2. $R^6$, $R^7$ and $R^8$ are the same or different substituents and can be selected from permissible $R^5$ groups, wherein any two $R^6$ or two $R^7$ or two $R^8$ groups on the same ring may join together to form another ring. In formula (3), there is a proviso that any two neighboring blocks have different repeat units.

Furthermore, the above derivative method comprising polymerizing at least one compound of formula (2) produces a conjugated heteroaromatic copolymer that comprises a fragment expressed by formula (4):

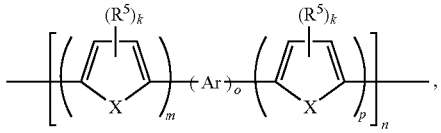

(4)

wherein n is an integer equal to or greater than 4, X is the same or different at each occurrence and is defined as above, and Ar, k, $R^5$, m, o and p are defined as above.

In some embodiments, the conjugated heteroaromatics copolymers expressed by formula (4) are alternative copolymers having two or more different types of repeat units alternatively appeared along the polymer chain.

The conducting polymer coatings of this invention can be provided by any suitable method known in the art, from the preformed conjugated polymer product or from the composition of this invention.

The composition for forming a conjugated heteroaromatic polymer coating of this invention comprises the aforementioned at least one compound of formula (1) as a monomer that comprises at least one compound of formula (1) with Z=H and Y≠H or the aforementioned at least one compound of formula (2) as a monomer that comprises at least one compound of formula (2) with Z=H and Y≠H, an acid as a polymerization catalyst selected from the group consisting of a protic acid, a polymeric acid and a non-transitional Lewis acid (i.e., a Lewis acid that is free of transition metal elements), and at least one functional component selected from the group of a solvent, a polymerization retardant, a polymer binder, a dopant, a dielectric layer protection agent, a plasticizer, an impact modifier, and a crosslinking agent.

In some embodiments, the at least one functional component contains at least a polymerization retardant comprising at least one Lewis base having a stronger basicity than the monomer.

The method for forming an electroactive coating of this invention includes: contacting the above composition with a substrate, and conducting at least one of a step of raising the temperature of the substrate, a step of evaporating partly the solvent in the composition, and a step of partly or completely the polymerization retardant used as the functional component in the composition, so as to initiate and/or continue polymerization on a surface of the substrate and/or in a pore of the substrate and form a conjugated heteroaromatic polymer.

The method for fabricating a solid electrolytic capacitor of this invention includes the following steps at least. An anode is formed. A dielectric layer is formed on the anode. An electroactive coating is formed on the dielectric layer to serve as a solid electrolyte. The solid electrolyte may be considered as a true cathode. The electroactive coating can be provided by all suitable methods know in the art, such as by solution-casting or melt-casting based on a preformed conjugated heteroaromatics polymer made by the polymerization method of this invention, or by solution-casting with a polymerization solution preformed from the composition of this invention. In one preferred embodiment, the electroactive coating is formed from the composition via in-situ polymerization, with the electroactive coating forming method mentioned above.

Because no air- and moisture-sensitive reagents are needed in the method for forming a conjugated heteroaromatic polymer of this invention, the method is friendly in chemical handling. Moreover, since the method needs a simple production facility and the manufacturing process is simple and safe, the manufacturing cost is low. In addition, since the polymerization can be effectively conducted at ambient temperature, the method is also energy-saving.

Also, the manufacturing process of the method of this invention is heavy-metal free, so that the method is environmentally friendly. The polymer product is transition-metal-free or may even be metal ion free, so that the application shelf life thereof is longer.

In addition, since the electroactive coating of this invention is prepared from a composition containing at least one acid catalyst selected from the group consisting of a protic acid, a non-transitional Lewis acid, and a polymeric acid, and is therefore also substantially free of transitional metal contaminants. The amount of the transition metal contaminants in the resultant electroactive coating is expected to be low and would be at least lower than 0.1 wt %, and preferably lower than 0.01 wt %, and more preferably lower than 0.001 wt %, and most preferably lower than 0.0001 wt %. The application products built based on these transitional-metal-free electroactive coating should also have long application shelf life.

The yield of the polymerization reaction is also high because of the high reactivity of the heteroaromatic ring having only one leaving group at its position 2 or 5.

Moreover, since the coupling reaction between two rings is directional, a regioregular conductive polymer can also be obtained.

Furthermore, the method of this invention is convenient in making block copolymers, which are, for example, potential good materials with broad range of UV-vis-NIR absorption for solar cell application. The method of this invention can also be used to produce an extremely high molecular weight polymer that may be used as an extra high mechanical strength material, due to the reactivity of the oligomer or polymer formed by the method with additional monomers fed thereto.

The method of this invention also has high tolerability to functional groups, such as acid, carbonyl, nitrile, —OH, or any acidic proton of $pK_a$<40. In addition, the polymer product of the method can also have other advantageous properties, such as high solubility (>1-10 wt %) in many common organic solvents (such as $CHCl_3$, $CH_2Cl_2$, TCE, THF, NMP, DMF, $CS_2$, xylene, toluene, chlorobenzene, and o-dichlorobenzene), good film forming properties, strong film adhesion with various substrates such as plastic, glass, metal, and metal oxide, high conductivity (~180 S/cm), and ability for self-assembling. Furthermore, the electronic or electrooptical application devices (such as LEDs and capacitors) fabricated with the transitional-metal-free polymer product of this invention may have longer service lifetime and/or much enhanced performance properties (such as the much improved voltage resistance of a capacitor device to high voltage operations).

Moreover, by including an effective polymerization retardant in the functional additive, such as a Lewis base having a stronger basicity than the monomer, the stability of the composition for forming an electroactive coating of this invention can be greatly enhanced, which allows the use of a composition having a much higher monomer concentration (as high as a neat monomer liquid, as described in example 44) so that a conductive polymer coating having a sufficient thickness may be formed in a single impregnation-polymerization cycle.

In order to make the aforementioned and other objects, features and advantages of this invention comprehensible, a preferred embodiment accompanied with figures is described in detail below.

DESCRIPTION OF EMBODIMENTS

Figure 1:
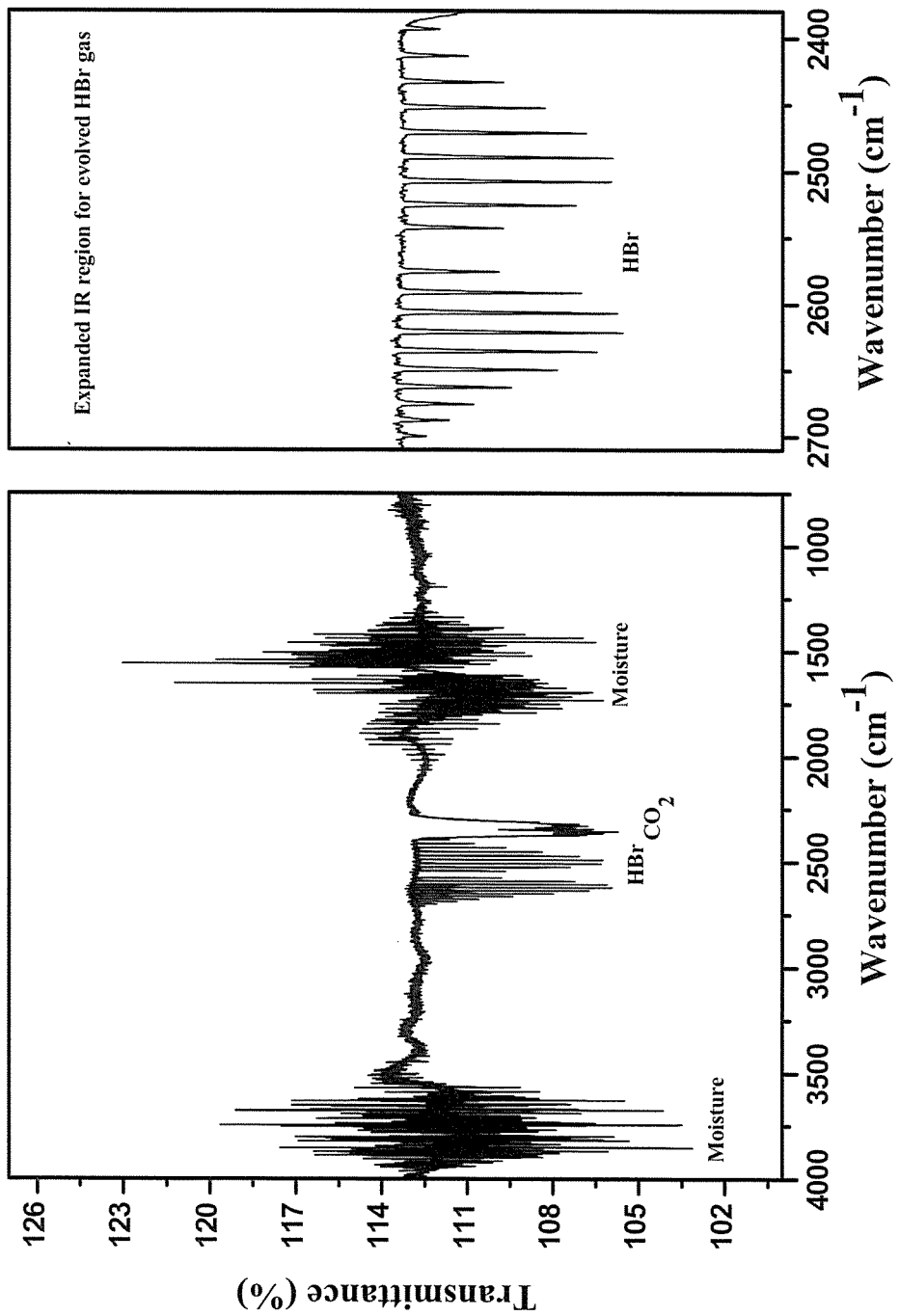
FIG. 1 is the IR spectrum of the gas generated from the polymerization reaction as collected in Example 1 of this invention.

It is first noted that the term "a compound of formula (1)" is sometimes called "a compound (1)" hereafter for simplicity. The same rule applies to formula (2).

The group X, $X_1$, $X_2$ or $X_3$ in the heteroaromatic ring of the above formulae (1)-(4) is selected from the group consisting of S, O, Se, Te, $PR^2$ and $NR^2$, wherein $R^2$ is selected from the group consisting of hydrogen, and substituted or unsubstituted alkyl, aryl, heteroaryl, alkanoyl, and aryloyl groups.

The group Y in the above formulae (1)-(2) is hydrogen (H), or a precursor of a good leaving group Y⁻ whose conjugate acid (HY) has a p$K_a$ of less than 30, preferably less than about 20, more preferably less than about 12, most preferably less than about 6. The preferred leaving group Y is selected from the group consisting of iodide, bromide, chloride, fluoride, sulfonates, phosphonates, carboxylates, cyano, nitro, and carbonates. The more preferred leaving group Y is selected from the group consisting of iodide, bromide, chloride, fluoride, cyano, and nitro.

The group Z in the above formulae (1) and (2) is hydrogen (H), silyl, or a precursor of good leaving group Z⁻ whose conjugate acid (HZ) has a p$K_a$ of less than 30. The preferred Z group is selected from the group consisting of hydrogen, silyl, iodide, bromide, chloride, fluoride, sulfonates, phosphonates, carboxylates, cyano, nitro, and carbonates. The most preferred Z group is selected from the group consisting of hydrogen, silyl, iodide, bromide, chloride, fluoride, cyano, and nitro.

It is essential in the method of this invention that the at least one compound of formula (1) or (2) being polymerized includes at least a compound of formula (1) or (2) with Z=H and Y≠H, which acts to trigger the polymerization reaction. A compound of formula (1) or (2) with Z=H and Y=H and/or a compound of formula (1) or (2) with Z≠H and Y≠H, which cannot be polymerized alone with the acid catalyst, can however be polymerized in the presence of the compound of formula (1) or (2) with Z=H and Y≠H due to the triggering effect.

<Substituents R on the Heteroaromatic Ring>

Each $R^1$ in formula (1), each $R^5$ in formula (2), each of $R^6$, $R^7$ and $R^8$ in formula (3), or each $R^5$ in formula (4), is independently selected from the group consisting of deuterium, alkyl, alkenyl, alkynyl, alkenynyl, aryl, alkylaryl, arylalkyl, allyl, benzyl, alkoxy, aryloxy, cycloalkyl, cycloalkenyl, cycloalkynyl, cycloalkenynyl, alkanoyl, aryloyl, aryloyloxy, alkanoyloxy, alkylthio, arylthio, alkylthioalkyl, alkylthioaryl, arylthioaryl, mercaptoalkoxy, mercaptoaryloxy, mercaptoalkyl, mercaptoaryl, mercaptoarylthio, mercaptoalkylthio, mercaptoalkylarylalkyl, mercaptoarylalkylaryl, halo, hydroxyl, hydroxyalkyl, hydroxyaryl, cyano, nitro, alkylsilyl, arylsilyl, alkoxysilyl, aryloxysilyl, mercapto, epoxy moieties, amino, aminoalkyl, aminoaryl, amido, amidoalkyl, amidoaryl, arylamino, diarylamino, alkylamino, dialkylamino, alkylarylamino, alkoxyalkyl, aryloxyalkyl, alkoxycarbonyl, alkoxysilylalkyl, alkylsilylalkyl, alkoxysilylaryl, alkylsilylaryl, heterocyclic ring, heteroaromatic ring, alkylsulfinyl, arylsulfinyl, alkylsulfonyl, arylsulfonyl, alkylsulfinylalkyl, alkylsulfonylalkyl, alkylcarboxylate, alkylsulfinate, alkylsulfonate, alkylphosphonate; derivatives of various acid functional groups including phosphonic acid, phosphinic acid, boric acid, carboxylic acid, sulfinic acid, sulfonic acid, sulfamic acid, and amino acid, wherein the acid derivatives may include ester, amide and metal salt; aliphatic moieties having a repeating unit of —(OCH₂CH₂)$_q$OCH₃, —(OCH₂CH(CH₃))$_q$OCH₃, —(CH₂)$_q$CF₃, —(CF₂)$_q$CF₃ or —(CH₂)$_q$CH₃, wherein q≥1; and a moiety of (OR³)$_r$OR⁴, wherein $R^3$ is a divalent $C_{1-7}$ alkylene moiety, $R^4$ is $C_{1-20}$ alkyl, 1≤r≤50. All the above mentioned substituent groups may be further substituted with allowable functional groups, such as ester, amino acid, halo, epoxy, amino, silyl, nitro, alkyl, aryl alkoxy, aryloxy, alkylthio, and arylthio groups.

Any two $R^1$ groups in formula (1), or any two $R^5$ groups on the same ring or on the neighboring rings in formula (2) and (4), or any $R^5$ together with the substituent group on the neighboring Ar ring in formula (2) and (4), or any two $R^6$ or any two $R^7$ or any two $R^8$ groups on the same ring or on neighboring rings in formula (3) may joint together to form a substituted or unsubstituted alkylene, alkenylene, or alkynylene chain completing an aromatic, heteroaromatic, heteroalicyclic or alicyclic ring system, which may include one or more heteroatoms and/or divalent moieties such as nitrogen, sulfur, sulfinyl, sulfonyl, phosphorus, selenium, ester, carbonyl, and oxygen, wherein permissible substituents are the aforementioned functional groups.

<Aromatic Group Ar in Formula (2)/(4)>

The aromatic group Ar in formula (2)/(4) is substituted or unsubstituted, mono- or poly-nuclear, aryl or heteroaryl. The aryl and heteroaryl preferably denote a mono-, bi- or tricyclic aromatic or heteroaromatic group with up to 25 C atoms that may also comprise condensed rings and is optionally substituted. Preferred aryl groups include, without limitation, benzene, biphenylene, triphenylene, naphthalene, anthracene, binaphthylene, phenanthrene, pyrene, dihydropyrene, chrysene, perylene, tetracene, pentacene, benzpyrene, fluorene, indene, indenofluorene, spirobifluorene, and the like. Preferred heteroaryl groups include, without limitation, 5-membered rings like pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings like pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, and fused systems like carbazole, indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, dithienopyridine, isobenzothiophene, dibenzothiophene, benzothiadiazothiophene, or combinations thereof. The heteroaryl groups may be substituted with allowable functional groups, such as acid, ester, amino acid, halo, epoxy, amino, silyl, nitro, alkoxy, aryloxy, alkylthio, arylthio, alkyl, fluoro, fluoroalkyl, or further aryl or heteroaryl substituents.

It is also noted that a compound of formula (2) with one or more Ar units can be prepared using the conventional synthetic methods know in the art. Alternatively, certain compounds of formula (2) can be prepared from corresponding compounds of formula (1) via the polymerization method of this invention.

<Acid Catalyst>

Useful acids for implementing this invention include Lewis acids, protic acids, and polymeric acids.

Useful Lewis acids include the salts of transition metals such as zinc salts and iron salts, and the salts of non-transitional elements such as boron salts, tin salts, aluminum salts, antimonic salts, arsenic salts, bismuth salts, germanium salts, tellurium salts, and thallium salts. Exemplary boron-containing Lewis acid includes boron trihalides, such as boron trifluoride, boron trichloride and boron tribromide; and the complexes of boron trihalides, such as boron trifluoride dihydride, boron trifluoride diethyl etherate, boron trifluoride-alcohol complex, boron trifluoride-methyl sulfide complex, boron trifluoride-phosphoric acid complex, and the like; with the boron trifluoride and its complexes being the preferable. Exemplary tin-containing Lewis acid includes tin(IV) chloride, tin(IV) bromide. Tin(IV) fluoride, tin(IV) sulfate, and the like; with tin(IV) chloride being the preferable.

In a preferred embodiment of using a Lewis acid, the non-transitional Lewis acid is used, such as one of the above boron-containing and tin-containing Lewis acids, so that the electroactive coating formed from with the method or the composition of this invention is substantially transitional-metal free.

Any protic acid can be used as long as they can protonate at least one reactive staring molecule to convert it into a protonated form that would then initiate the coupling reaction with another non-protonated starting molecule. The useful protic acid may have an acidic proton with a $pK_a$ value of less than 20, preferably with a $pK_a$ value of less than 10, more preferably with a $pK_a$ value of less than 5, most preferably with a $pK_a$ value of less than 4. The lowest acidity required for an acid to function as an effective acid catalyst in this invention depends on the basicity of the reactive starting molecules used. In general, the higher the basicity of the reactive starting molecules, the lower the acidity of the protic acid may be required to initiate the polymerization. While for a given reactive starting molecule, the stronger acid catalyst will lead to a higher number of initiation and a faster chain propagation rate. Useful protic acid includes inorganic acids, organic acids, and polymeric acids. Illustrative useful inorganic acids includes HF, HCl, HBr, HI, $HNO_3$, $HNO_2$, $HBF_4$, $HPF_6$, $HSbF_6$, $H_2SO_4$, $H_2SO_3$, $HClO_4$, $HClO_3$, $HClO_2$, $HClO$, $H_3PO_4$, $H_3AsO_4$, $H_3SbO_4$, and $H_3BiO_4$. Illustrative useful organic acids includes sulfonic acids, sulfinic acid, sulfamic acid, carboxylic acids, phosphonic acid, phophinic acid, boric acid, and amino acid, such as toluenesulfonic acid, methanesulfonic acid, trifluoromethanesulfonic acid, ethanesulfonic acid, benzenesulfonic acid, toluenesulfonic acid, trifluoroacetic acid, difluoroacetic acid, fluoroacetic acid, perfluoropropionic acid, perfluorobutyric acid, perfluorooctanoic acid, trichloroacetic acid, dichloroacetic acid, chloroacetic acid, acetic acid, oxalic acid, malonic acid, citric acid, phthalic acid, formic acid, fluorosulfuric acid, ascorbic acid, tartaric acid, nitrosylsulfuric acid, methylsulfamic acid, nitrilotriacetic acid, nitrilotris(methylene)triphosphonic acid, methylenediphosphonic acid, superacids like fluoroantimonic acid and magic acid, phosphoric acid, pyrophosphoric acid, triphosphoric acid, phenylphosphonic acid, phenylphosphinic acid, and the like.

Illustrative useful polymeric acids include polystyrenesulfonic acid, polyacrylic acid, polymethacrylic acid, polymaleic acid, and polyvinylsulfonic acid, with polystyrenesulfonic acid being the most preferable.

The acid described above can be used either alone or as a mixture with one or more other acid(s). The amount of acid used to implement this invention can vary widely, depending on the desirable nature and properties that are intended to build in with the products. In general, a higher amount of acid catalyst will induce a higher number of initiations, leading to a smaller average molecular weight; while a lower amount of acid catalyst will induce a lower number of initiations, leading to greater average molecular weight. The leaving group released as in the form of HY (such as HBr or other acid) during the coupling polymerization step may participate to a certain extents as an effective acid catalyst for the subsequent polymerization steps. The extent of involvement of the in-situ released HY in the polymerization reaction varies, depending on the polarity and the basicity of starting material and the employed solvent. In general, the greater the basicity and the polarity of the starting material and/or the reaction solvent medium is, the higher extent of the involvement of the in-situ released HY will be. Thus, an amount of acid catalyst as high as 20 equivalents (based on the mole number of the reactive starting molecules) or even greater can be used, if a low molecular weight polymers or oligomers such as dimers or trimers are intended to obtain. While, an amount of acid catalyst as low as 0.01-0.001 equivalents or less can also be used, if a high molecular weight polymer are intended to obtain or whenever the released HY can serve as an effective supplementary acid catalyst for performing the polymerization.

<Solvents>

The reactive starting molecules used to implement this invention can be either in a neat liquid form, a pure solid form, or a molten form, or as a solute form dissolving or dispersing in a given solvent medium. For example, a neat liquid of reactive starting material can be used to mix with a liquid acid catalyst, such as trifluoroacetic acid or a solid acid such as toluenesulfonic acid. The resultant mixture may form a single miscible liquid phase at the first moment, or it can form initially a two phase liquid/liquid or liquid/solid mixture systems that may then gradually turned into a single phase mixture as the polymerization proceeding with time. The reaction can also be carried out by mixing a solid starting material in a crystal form or in a fine powdery form with a liquid acid catalyst, the surrounding acid catalyst molecule will then initiate the polymerization starting from the surface of the solid. The starting material can also be an emulsion form or a small liquid drop form dispersing in a solvent medium with or without the aid of a surfactant, the added acid catalyst can then initiate the polymerization from the surface of or within the emulsion micelles or liquid drops, resulting in nano-sized and/or micrometer-sized conducting polymer particles. The reactive starting material can also be provided as thin liquid or solid coating layer that may be induced to undergo polymerization by contacting the coating with an acid vapor such as HCl, HBr, $BF_3$, or trifluoroacetic acid, resulting in a thin conducting layer of polyheteroaromatics in situ.

Any solvent or solvent mixture can be used as the desirable solvent medium in implementing the present invention as long as it can help dissolve or disperse, mix or contact the reactive starting molecules and acid catalyst. Illustrative of useful solvents include alcohols, linear and cyclic ethers, hydrocarbons, halogen-containing hydrocarbons, substituted aromatics, ketones, amides, nitriles, carbonates, sulfoxides and other sulfur containing solvents, nitro substituted alkanes and aromatics, water or mixtures thereof.

Exemplary alcohols include methanol, ethanol, isopropanol, and the like. Illustrative linear and cyclic ethers include tetrahydrofuran, tetrahydropyran, 2-methyltetrahydrofuran, diethyl ether, diglyme, glyme, dipropyl ether, dibutyl ether, methyl butyl ether, diphenyl ether, dioxane, diethylene glycol, ethylene glycol (EG), and the like. Illustrative aliphatic hydrocarbons include hexane, heptane, octane, nonane, decane, and the like. Exemplary halogen-containing hydrocarbons, include dichloromethane, chloroform, 1,2-dichloroethane, carbon tetrachloride, dichloroethane, dibromoethane, trichloroethane, tribromoethane, tetrachloroethane, and the like.

Illustrative substituted aromatics include xylene, anisole, toluene, benzene, cumene, mesitylene, phenol, cresol, dichlorobenzene, chlorobenzene, and the like. Exemplary ketones include acetone, propanone, butanone, pentanone, hexanone, heptanone, octanone, acetophenone, and the like. Illustrative amides include dimethylformamide, N,N-dimethylacetamide, N-methyl-2-pyrrolidinone and the like. Exemplary nitriles include acetonitrile, propionitrile, benzonitrile, butyronitrile, and the like. Illustrative sulfoxides and other sulfur containing solvents include dimethylsulfoxide, and the like. Illustrative nitro substituted alkanes and aromatics include nitromethane, nitroethane, nitropropane, nitroisopropane, nitrobenzene, and the like. Exemplary carbonates include propylene carbonate, ethylene carbonate, and the like. Exemplary esters include ethyl acetate, methyl acetate, phenyl acetate, ethyl benzoate, and the like. In general, the amount of solvent or solvent mixture employed for the reaction media is not critical, so long as the reactive starting molecules and acid catalyst can be dissolved or dispersed, mixed or contacted with each other.

<Reaction Temperature and Reaction Time>

The useful reaction temperatures to implement this invention can vary widely, depending on the nature of the starting molecules and the purpose of applications. Since this invention provides a very effective method for making polyheteroaromatics, most of the polymerization can undergo efficiently to give essentially quantitative yields within rather short time interval (such as 5 to 30 minutes) at ambient temperatures, without the need of heating or cooling. So, from the economical point of view, it is most desirable to perform the reaction at ambient temperature, which is the most convenient and energy saving approach. While for the most reactive starting molecules, such as 2-bromo-3,4-alkylenedioxythiophene, or 2-bromo-furans, or 2-bromopyrroles, it may be desirable to use some lower reaction temperatures (such as 0° C.) for gaining more fine-tuning controls on the polymerization behaviors. For those least reactive starting molecules, such as 2-bromothiophenes bearing with directly attached electron-withdrawing groups, such as ketone, carboxylic acid, sulfonic acid groups, it may be desirable to use some higher reaction temperatures (30-60° C.) to increase the polymerization rate for shortening the overall reaction time. For the case of making conductive coating via the in-situ polymerization of a surface coating layer of the starting molecules via the included latent acid complex (such as acid-base complex), a heating treatment step may be needed to help remove the base and meanwhile release the acid catalyst for inducing the polymerization.

The useful reaction time to implement this invention can vary widely, depending on the nature of the starting molecules and the targeted properties of the polymer intended to obtain. In general, under optimal conditions, short reaction time (such as 0.1 to 2.5 hours) can provide polymers (having essentially quantitative yields) with narrower molecular weight distribution (i.e., having a small polydispersity, PDI, value) and higher regioregularity, while the longer reaction time can provide higher molecular weight polymer (also with essentially quantitative yields) but also with broader molecule weight distribution (i.e., with higher PDI values).

<Repeat Unit>

In general, the number of repeat units of the obtained conjugated heteroaromatic homopolymers or copolymers is not critical and may vary widely. The greater the number of repeat units, the greater the viscosity and molecular weight of the conjugated homopolymer or copolymer will be. In those applications where a conjugated homopolymer or copolymer of relatively low molecular weight and viscosity is required, such materials may be used, and in those applications where a conjugated homopolymer or copolymer of relatively high molecular weight and viscosity is required, then such materials can be used. The number of repeat units is at least about 4. The upper limit can vary widely depending on the desired molecular weight and viscosity and the required degree of processibility, such as melt processibility, solution processibility and the like. In the preferred embodiments of the invention, the number of repeat units is at least about 10, and in the particularly preferred embodiments, the number of repeat units is at least about 20. Amongst the particularly preferred embodiments, most preferred are those embodiments in which the number of repeat units is at least about 25.

<Different Embodiments for the Polymerization Procedure>

In some embodiments of the method for forming a conjugated heteroaromatic polymer of this invention, at least one compound of formula (1) is polymerized using an above-mentioned acid as a catalyst,

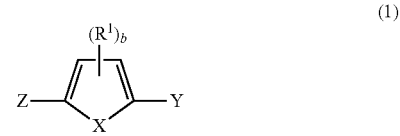

(1)

wherein X is selected from the group consisting of S, O, Se, Te, $PR^2$ and $NR^2$, wherein $R^2$ is selected from the group consisting of hydrogen, and substituted and unsubstituted alkyl, aryl, heteroaryl, alkanoyl, and aryloyl groups. Y is hydrogen (H), or a precursor of a good leaving group $Y^-$ whose conjugate acid (HY) has a $pK_a$ of less than 30. Z is hydrogen (H), silyl, or a good leaving group $Z^-$ whose conjugate acid (HZ) has a $pK_a$ of less than 30. The value b is 0, 1 or 2. $R^1$ is defined as above. The at least one compound of formula (1) being polymerized comprises at least one compound of formula (1) with Z=H and Y≠H.

In an embodiment, the at least one compound of formula (1) being polymerized consists of a single compound of formula (1) with Z=H and Y≠H. The conjugated heteroaromatic polymer thus obtained is a homopolymer having only one kind of repeating unit.

In another embodiment, the at least one compound of formula (1) being polymerized consists of two or more compounds of formula (1) with Z=H and Y≠H. It is possible that the two or more compounds of formula (1) with Z=H and Y≠H contain different combination sets of X, $R^1$ and b and are added in sequence to form two or more different polymer blocks.

In another embodiment, the more reactive compound of formula (1) with Z=H and Y≠H is polymerized with at least one less reactive compound selected from the group consisting of compounds (1) with Z≠H and Y≠H and compounds (1) with Z=H and Y=H. The compound of formula (1) with Z=H and Y≠H and the at least one less reactive compound may be polymerized at the same time. Alternatively, the more reactive compound of formula (1) with Z=H and Y≠H is polymerized first to form a polymer chain, and then the at least one less reactive compound is added to react with a terminal of the polymer chain and elongate the polymer chain. In still another embodiment, the at least one less reactive compound comprises two or more compounds, and the two or more compounds are added in a sequence to form two or more different polymer blocks.

In an embodiment, the at least one less reactive compound is selected from the group consisting of compounds (1) with Z≠H and Y≠H, or from the group consisting of compounds (1) with Z=H and Y=H.

In another embodiment, the at least one less reactive compound comprises at least one compound of formula (1) with Z≠H and Y≠H and at least one compound of formula (1) with Z=H and Y=H.

In the above embodiments, the compound of formula (1) with Z=H and Y≠H and the at least one less reactive compound may have different groups X. For example, a thiophene-based compound (X=S) as the compound of formula (1) with Z=H and Y≠H can be polymerized with a pyrrole-based compound (X=N) as the at least one less reactive compound.

In addition, when a compound (1) with Z=H and Y≠H is polymerized with another compound (1) with Z=H and Y≠H or with at least one less reactive compound as defined above, either a homopolymer or a copolymer can be obtained. Specifically, when each of X, $R^1$ and k of the compounds is fixed, a homopolymer is obtained; when either of X, $R^1$ and k is not fixed, a copolymer is obtained.

In some other embodiments of the method of this invention, at least one compound of formula (2) is polymerized using an above-mentioned acid as a catalyst,

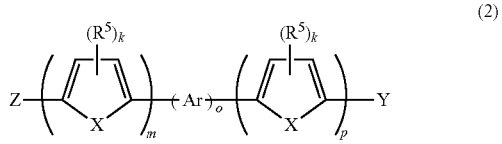

(2)

wherein X, Y, Z and Ar are defined as above. The values m, o and p are each independently an integer equal to or greater than 0, with a proviso that m+p≥1. Each k is independently 0, 1 or 2. $R^5$ is defined as above, wherein any two $R^5$ on the same ring or on neighboring rings, or any $R^5$ and a substituent group on a neighboring Ar ring, may join together to form another ring. The at least one compound of formula (2) being polymerized comprises at least a compound with Z=H and Y≠H.

In an embodiment, the at least one compound of formula (2) being polymerized comprises a plurality of compounds of formula (2) with Z=H and Y≠H having different m+p values, with o=0 and m+p≥4. This corresponds to a case where oligomeric or polymeric molecules are further polymerized with each other to form polymers with greater molecular weights.

In another embodiment, with o=0, the at least one compound of formula (2) being polymerized comprises a plurality of compounds with Z=H and Y≠H having different m+p values each being equal to or greater than 4, and at least one less reactive compound selected from the group consisting of compounds of formula (2) with Z≠H, Y≠H and m+p=1, and compounds of formula (2) with Z=H, Y=H and m+p=1. This corresponds to a case where monomers are added to oligomeric or polymeric chains to elongate the chain.

In an embodiment, the conjugated heteroaromatic copolymer formed from the method using at least one compound of formula (1) includes a fragment expressed by formula (3):

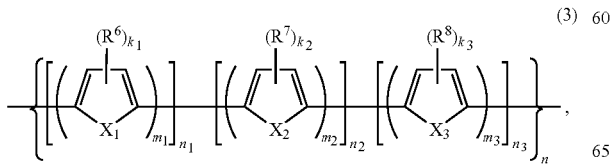

(3)

wherein n is an integer equal to or greater than 1, $m_1$, $m_2$ and $m_3$ are independently integral equal to or greater than 2, and $n_1$, $n_2$ and $n_3$ are independently 1 or 0. $X_1$, $X_2$, and $X_3$ are the same or different, and are independently selected from the group consisting of S, O, Se, Te, $PR^2$ and $NR^2$, wherein $R^2$ is selected from the group consisting of hydrogen, and substituted and unsubstituted alkyl, aryl, heteroaryl, alkanoyl, and aryloyl groups. The values $k_1$, $k_2$ and $k_3$ are independently 0, 1 or 2. $R^6$, $R^7$, and $R^8$ are the same or different substituent and can be selected from permissible $R^5$ groups, wherein any two $R^6$ or two $R^7$ or two $R^8$ groups on the same ring may join together to form another ring. In formula (3), there is a proviso that any two neighboring blocks have different repeat units.

The conjugated heteroaromatic copolymer formed from the method using at least one compound of formula (2) includes a fragment expressed by formula (4):

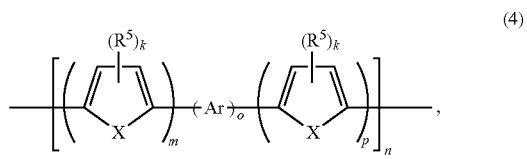

(4)

wherein n is an integer equal to or greater than 4. X is the same or different at each occurrence, and is selected from the group consisting of S, O, Se, Te, $PR^2$ and $NR^2$, wherein $R^2$ is selected from the group consisting of hydrogen, and substituted or unsubstituted alkyl, aryl, heteroaryl, alkanoyl, and aryloyl groups. Ar is a substituted or unsubstituted, mono- or poly-nuclear, aryl or heteroaryl ring. The value k is 0, 1 or 2. Each $R^5$ is a substituent, wherein the two $R^5$ on the same ring or on neighboring rings, or $R^5$ and a substituent group on a neighboring Ar ring, may join together to form another ring. The values m, o and p are each independently an integer equal to or greater than 0, with a proviso that m+p≥1.

In some embodiments, the conjugated heteroaromatics copolymers are alternative copolymers having two or more different types of repeat units alternatively appeared along the polymer chain.

An example of such a copolymer is formed by first polymerizing a compound having a specific set of $X_1$, $R^6$ and $k_1$ and with Z=H and Y≠H to form a polymer chain, and then adding at least one less reactive compound defined as above and having a different combination set of $X_2$, $R^7$ and $k_2$ to react with the terminals of the polymer chains and elongate the polymer chains to form a diblock copolymer. Similarly, another less reactive defined as above and having a different combination set of $X_3$, $R^8$ and $k_3$ can then be added subsequently to react with the terminals of the polymer chains and elongate the polymer chains to form a triblock copolymer. If the combination set of $X_3$, $R^8$ and $k_3$ is different from the combination set of $X_1$, $R^6$ and $k_1$, then a ABC type of triblock copolymer is yielded. Whereas, if the combination set of $X_3$, $R^8$ and $k_3$ is the same as the combination set of $X_1$, $R^6$, and $k_1$, then a ABA type of triblock copolymer is yielded. Likewise, multi-block copolymers of any types can be similarly prepared.

In some examples of the conjugated heteroaromatic copolymer, one of $X^1$ and $X^2$ represents S and the other of $X^1$ and $X^2$ represents O, Se, Te, $PR^2$ and $NR^2$.

<Dopants>

The conjugated homopolymer or copolymer, as used in this invention, can be either in the neutral undoped (non-conductive) form(s) or in the conductive and doped forms with various doping degrees.

In the case of conductive and doped forms, the heteroaromatic homopolymer or copolymer can be doped with a suitable dopant to render the polymer electrically conductive. Dopants for use in general can be such materials which are known in the art for use in doping conjugated backbone homopolymer or copolymers to form conductive or semiconductive polymers, such as oxidizing dopants can be used. Illustrative of useful oxidizing dopants are $AsF_5$, $NO^+$ and $NO_{2+}$ salts (such as $NOBF_4$, $NOPF_6$, $NOSbF_6$, $NOAsF_6$, $NO_2BF_4$, $NO_2PF_6$, $NO_2AsF_6$, $NO_2SbF_6$, and the like), $HClO_4$, $HNO_3$, $H_2SO_4$, $SO_3$, $I_2$, and Fe(III) salts (such as $FeCl_3$, $Fe(OTs)_3$, $Fe(CF_3SO_3)_3$, and the like). Illustrative of other dopants includes protonic acid dopants. Such dopants include inorganic acids, such as hydrofluoric acid, hydroiodic acid, phosphoric acid, nitric acid, boric acid, sulfuric acid, $HNO_2$, $HBF_4$, $HPF_6$, $HSbF_6$, $H_2SO_3$, $HClO_3$, $HClO_2$, HClO, nitrosylsulfuric acid, fluorosulfuric acid, pyrophosphoric acid, triphosphoric acid, superacids like fluoroantimonic acid and magic acid, and the like. Other protonic acid dopants are organic acids and polymeric acid, such as aryl or alkyl compounds containing one or more sulfonic acid, sulfinic acid, sulfamic acid, carboxylic acid, phosphonic acid, phosphinic acid, or boric acid moieties, or the combination thereof. Yet, other useful dopants include polymeric acids, such as polystyrenesulfonic acid, polyacrylic acid, polymethacrylic acid, polymaleic acid, and polyvinylsulfonic acid.

In the cases of highly electron-rich polyheteroaromatic systems, poly(ethylene-3,4-dioxythiophene) (PEDOT), air can even work as an effective oxidant and/or dopant.

<Doping Degree and Conductivity>

The amount of dopant added to the conjugated backbone homopolymer or copolymer is not critical and may vary widely. In general, sufficient dopant is added to the homopolymner or copolymer to at least form doped polymer that is a semi-conductor, which has a conductivity of at least about $10^{-12}$ ohm$^{-1}$ cm$^{-1}$. The upper level of conductivity is not critical and depends on the type of homopolymer or copolymer employed. In general, for those applications utilizing the conductivity property, the highest level of conductivity obtained is provided without unduly adversely affecting the environmental stability of the conjugated backbone homopolymer or copolymer. In the various embodiments of the present invention, the amount of dopant employed is sufficient to provide a conductivity of at least about $10^{-9}$ ohm$^{-1}$ cm$^{-1}$. In particularly preferred embodiments according to the present invention, the amount of dopant is sufficient to provide a conductivity of about $10^{-2}$ ohm$^{-1}$ cm$^{-1}$ to about $10^{+3}$ ohm$^{-1}$ cm$^{-1}$.

<Potential Applications>

The polyheteroaromatic prepared according to the present invention can be used for any purpose. For example, where such blends are electrically conductive, they can be used in the fabrication of articles that comprise electrically conductive portions and electrically non-conductive portions, and articles that are completely electrically conductive. Examples of useful applications include electrically conductive polymer housings for EMI shielding of sensitive electronic equipment such as microprocessors; infrared, radio frequency and microwave absorbing shields; flexible electrical conducting connectors; conductive bearings and brushes; semiconducting photoconductor junctions; electrodes; capacitors; field effect transistors; organic memory devices; solar cell device; photovoltaic cells; super capacitor; sensors; smart cards; nonlinear optical materials; medical applications; artificial muscle; reinforcement materials and/or additives; optically transparent or non-transparent corrosion-preventing coatings for corrodible materials such as steel; antistatic materials and optically transparent or non-transparent coatings for packaging electronic components; antistatic carpet fibers; antistatic waxes for floors in computer rooms; antistatic finishes for CRT screens, aircraft, and auto windows, and the like.

Various other applications involve the use of the conducting coatings of polyheteroaromatics produced according to the present invention include applications such as conductive plastic gas tanks; solar window coatings; transparent electrical elements for heated windows and heated liquid crystal displays; electrochromic displays, electrical contacts for electroluminescent displays and electroluminescent lights, and electrical contacts for piezoelectric films for transparent loud speakers; transparent conducting coatings for windows in burglar alarm systems; membrane coatings for chemical separations (such as $O_2$ and $N_2$, for example), and conducting coatings for membrane switches, and a discharge layer or photoresist layer for lithographic process.

Applications involving use of the electroactive coating comprising a conjugated heteroaromatic polymer produced according to this invention include applications such as capacitors, supercapcitors, antistatic objects such as antistatic textiles, antistatic packaging and buffering materials (e.g., antistatic foams, wraps, bags, trays, cases, boxes, and the like), DSSC and PV solar cells, LED, electroactive coatings for membrane switches, transparent electroactive coating layer for touch screens, electroactive coating layer for touch panels, electroactive coatings for flexible electronic devices, electroactive coating for capacitor microphones, via hole conductive coating for circuitry board, and a discharge layer or photoresist layer for a lithographic process.

The electroactive coatings can be prepared from the preformed conjugated polymer products of this invention by any suitable method known in the art. Since the polymerization method of this invention also provide a very clear polymer solution (i.e., free of undesirable impurities and byproducts), the resultant polymerization solution obtained after the polymerization process can also be directly applied to prepare an electroactive coating. Alternatively, the electroactive coating can be prepared by an in-situ polymerization process from the mixture solution containing the monomer and the acid catalyst. In a preferred embodiment of this invention, the in-situ polymerization and coating process for preparing an electroactive coating is performed by using the composition of this invention that comprises a monomer, an acid catalyst, and at least one functional component selected from the group consisting of a solvent, a polymerization retardant, a polymer binder, a dopant, a dielectric layer protection agent, a plasticizer, an impact modifier, and a crosslinking agent. In a more preferred embodiment, the at least one functional component contains at least one polymerization retardant that will slow down or inhibit the polymerization activity of the mixture solution of the monomer and the acid catalyst of this invention.

The following examples are presented to more particularly illustrate the present invention, and should not be construed as being limitations on the scope and spirit of the present invention.

Figure 2A:
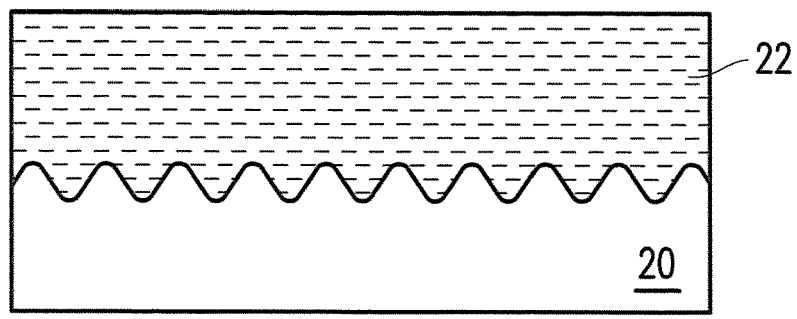
FIGS. 2A-2C illustrate, in a cross-sectional view, an application of the method of this invention wherein the polymerization of at least one compound of formula (1) or (2) is performed over a surface of a substrate to form an organic conductive film.
Figure 2B:
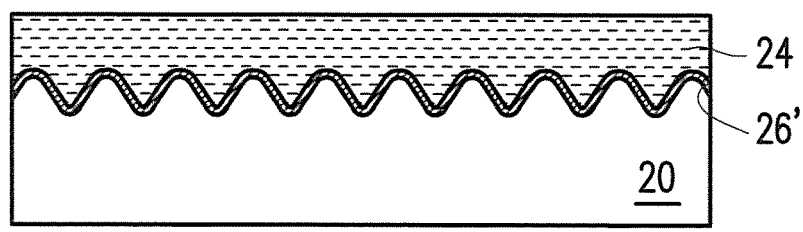
Figure 2C:
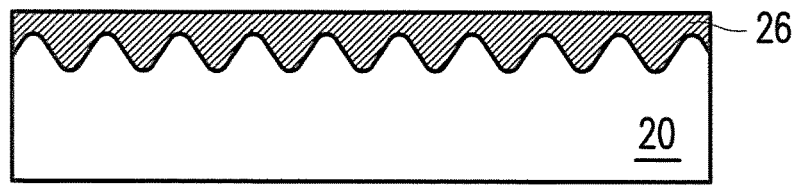

For example, FIGS. 2A-2C illustrate, in a cross-sectional view, an application of the method of this invention wherein the in-situ polymerization of at least one compound of formula (1) or (2) is performed over a surface of a substrate to form an organic conductive film.

Referring to FIG. 2A, a solution 22 of a compound of formula (1) and/or (2) with Z=H and Y≠H at a desirable low concentration together with an appropriate amount of acid catalyst in a proper solvent or cosolvent mixture is applied to a substrate 20 at a desirable low temperature so that the polymerization activity is limited. The substrate 20 may be any substrate requiring a surface conductive coating, such as a substrate of an electrode, a solar cell, a LED or an antistatic object. Particularly, the substrate 20 may be a porous substrate used for fabricating a capacitor, as illustrated in the figure.

Referring to FIG. 2B, a polymerization reaction of this invention is performed and/or initiated on the substrate 20 to form an organic conductive polymer solution or film on the substrate 20 by either raising the temperature of the substrate 20 or evaporating partly or fully the solvent to facilitate the polymerization. For example, as shown in the figure, the solvent is partly removed through evaporation to yield a more concentrated monomer solution to initiate the polymerization, resulting in a concentrated solution 24 of the conductive polymer on the substrate, wherein a thin layer 26' of the conductive polymer in the form of precipitates may be deposited on the surface of the substrate 20. In some case, although some polymerization might have been started in the premixing stage to yield some oligomers or lower molecular weight polymers in the casting solution, the oligomer or polymer molecules can undergo continuous polymerization effectively when the solution becomes more concentrated in the later solvent-evaporation stage, leading to higher molecular weight polymers and resulting in a polymer coating with greater mechanical strength and higher conductivity.

Referring to FIG. 2C, the remaining solvent is fully removed from the concentrated solution 24 of the organic conductive polymer, leaving an organic conductive polymer film 26 on the substrate 20.

In a preferred embodiment, the electroactive surface coatings are prepared using the composition of this invention.

<Composition for Forming Electroactive Coating>

The composition for forming a conjugated heteroaromatic polymer coating of this invention comprises the aforementioned at least one compound of formula (1) as a monomer that comprises at least one compound of formula (1) with Z=H and Y≠H or the aforementioned at least one compound of formula (2) as a monomer that comprises at least one compound of formula (2) with Z=H and Y≠H, an acid as a polymerization catalyst selected from the group consisting of a protic acid, a polymeric acid, and a non-transitional Lewis acid, and at least one functional component selected from the group consisting of a solvent, a polymerization retardant, a polymer binder, a dopant, a dielectric layer protection agent, a plasticizer, an impact modifier, and a crosslinking agent. In a more preferred embodiment, the at least one functional component contains at least a polymerization retardant.

The at least one compound of formula (1) contained in the composition may consist of a single compound of formula (1) with Z=H and Y≠H, or may include a combination of two or more compounds of formula (1) including at least one compound of formula (1) with Z=H and Y≠H, as mentioned in the above embodiments. The at least one compound of formula (2) contained in the composition may consist of a single compound of formula (2) with Z=H and Y≠H, or may include a combination of two or more compounds of formula (2) including at least one compound of formula (2) with Z=H and Y≠H, as mentioned in the above embodiments. In some desirable embodiments, the composition may contain compounds of both formula (1) and formula (2), with the proviso that at least one of the compounds of formula (1) or formula (2) has a structure with Z=H and Y≠H.

The acid as the polymerization catalyst and the solvent are as exemplified above.

In the more preferred embodiment, the at least one functional component contains at least a polymerization retardant that will slow down or inhibit the polymerization activity of the mixture solution of the monomer and the acid catalyst of this invention.

The polymerization retardant includes a Lewis base having a stronger basicity than the monomer. In a preferred embodiment, the Lewis base is a compound containing at least one atom having lone pair electrons, wherein the at least one atom having lone pair electrons may be preferably selected from the group consisting of O, N, S and P atoms. Examples of the effective O-containing Lewis base include: $H_2O$; alcohols such as methanol, ethanol, propanol, isopropanol, butanol, isobutanol, t-butyl alcohol, cyclopentanol, cyclohexanol, ethylene glycol, and so on; ketones such as acetone, ethyl methyl ketone, cyclopentanone, cyclohexanone, hexafluoroacetone, acetylacetone, and so on; ethers such as dimethyl ether, ethyl methyl ether, diethyl ether, tetrahydrofuran, tetrahydropyran, dioxane, and so on; esters such as methyl acetate, ethyl acetate, methyl benzoate, phenyl benzoate, and so on; carbonates such as dimethyl carbonate, ethylene carbonate, propylene carbonate, and so on; siloxanes such as hexamethyldisiloxane, hexamethylcyclotrisiloxane, and so on; and O-containing polymers such as polyethers, polyacetals, polyesters, polyketones, polyetherketones, polyetheretherketone, poly(phenylene oxide), polysiloxanes, polyacrylates, polymethacrylates, and so on.

Examples of the effective N-containing Lewis base include: amines, such as methylamine, dimethylamine, trimethylamine, ethylamine, diethylamine, triethylamine, aniline, N-methylaniline, N,N-dimethylaniline, pyrrolidine, piperidine, morpholine, quinuclidine, 3-pyrroline, and so on; amides, such as 1-methyl-2-pyrrolidinone, 2-pyrrolidinone, N,N-dimethylformamide, N,N-dimethyl acetamide, and so on; imides, such as phthalimide, uracil, thymine, cytosine, and so on; nitriles, such as acetonitrile, benzonitrile, and so on; N-containing heterocyclic compounds and N-containing heteroaromatic compounds, such as imidazole, 2-methylimidazole, pyrazole, triazole, pyridine, pyridazine, pyrazine, indole, quinoline, pyrimidine, purine, adenine, guanine, and so on; N-containing polymers, such as polyamines, polyamides, polyimides, polyetherimides, polyureas, polyurethanes, polyphosphazene, and so on.

Examples of the effective S-containing Lewis base include: sulfides, such as dimethyl sulfide, diethyl sulfide, tetrahydrothiophene, tetrahydrothiapyran, and so on; sulfoxides, such as dimethylsulfoxide, tetramethylene sulfoxides, and so on; sulfones, such as dimethylsulfone, tetramethylene sulfone, and so on; sulfites, such as dimethyl sulfite, diethyl sulfite, and so on; and S-containing polymers, such as poly(phenylene sulfide), poly(alkylene sulfide)s, polysulfones, polythioacetals, and polythioketals, etc.

Examples of the effective P-containing Lewis base include: phosphines, such as triphenylphosphine, trimethylphosphine, tributylphosphine, tricyclohexylphosphine, di-t-butylphosphine, tris(dimethylamino)phosphine, and so on; phosphine oxides, such as trioctylphophine oxide, triphenylphosphine oxide, and so on; phosphites such as dimethylphosphite, di-t-butylphosphite, tributylphosphite, triphenylphosphite, tetraethyl pyrophosphite, and so on; phosphonates, such as diethyl ethylphosphonate, diphenyl benzylphosphonate, and so on; phosphates, such as trimethylphosphate, triphenylphosphate, and so on; phosphoramides, such as hexamethylphosphoramide and hexaethylphosphoramide, and so on; and P-containing polymers, such as polyphosphazene, and so on.

The concentration of the monomer in the composition may range from 1 wt % to about 99 wt %, preferably from 10 wt % to about 99 wt %. The molar ratio of the acid as the polymerization catalyst to the monomer may range from 0.0001 to 0.5, preferably from 0.001 to 0.3. The molar ratio of the polymerization retardant to the acid catalyst may range from 0.1 to 1000, preferably from 1 to 100, more preferably from 1 to 20.

<Method for Forming Electroactive Coating>

The method for forming an electroactive coating of this invention includes: a) contacting the above composition with a surface of a substrate, and b) conducting at least one of a step of raising the temperature of the substrate, a step of evaporating partly the solvent in the composition, and a step of evaporating partly or completely the polymerization retardant used as the functional additive in the composition, so as to induce and/or continue the polymerization on the surface of the substrate and form an electroactive coating comprising a conjugated heteroaromatic polymer.

The substrate may include a porous substrate used for fabricating a capacitor, corresponding to the above substrate 20 (FIGS. 2A to 2C) that may be a substrate of an electrode, a solar cell, a LED or an antistatic object. The porous substrate may be a porous anode electrode of a capacitor element having a desirable dielectric surface layer formed by anodization.

The raised temperature may be within the range of 30 to 200° C.

In addition, by including an effective polymerization retardant as a functional component, such as a Lewis base having a stronger basicity than the monomer, the stability of the composition for forming an electroactive coating of this invention can be greatly enhanced, which will allow the use of a composition having a much higher monomer concentration so that a conductive polymer coating having a sufficient thickness may be formed in a single cycle of the above steps a) and b). Nevertheless, if required, it is also possible to repeat the steps a) and b) for at least one cycle.

An example where the at least one functional component includes at least a polymerization retardant is described below, also being illustrated by FIGS. 2A to 2C.

Referring to FIG. 2A, a solution 22 of a compound of formula (1) or (2) with Z=H and Y≠H or a neat liquid of the compound is applied to a substrate 20. Because of the presence of the polymerization retardant, the solution 22 is allowed to use a desirable higher concentration of the compound, or even a neat liquid of the compound. The solution 22 may also or alternatively contain shorter polymer formed previously with the method of this invention. The substrate 20 may be any one mentioned above.

Referring to FIG. 2B, a polymerization reaction of this invention is initiated and/or continued (when the solution contains shorter polymer formed previously with the method of this invention) by conducting at least one of a step of raising a temperature of the substrate 20, a step of evaporating partly the solvent in the composition, and a step of evaporating partly or completely the polymerization retardant in the composition, so as to form an electroactive solution or film 24 on the substrate 20. A thin layer 26' of the conductive polymer in the form of precipitates may be deposited on the surface of the substrate 20. It is also possible that the preformed oligomer or polymer molecules can undergo continuous polymerization effectively, leading to higher molecular weight polymers and eventually resulting in an electroactive polymer coating with greater mechanical strength and higher conductivity.

Referring to FIG. 2C, the remaining solvent is then fully removed as in the above example, leaving an electroactive polymer film 26 on the substrate 20.

<Method for Fabricating Solid Electrolytic Capacitor>

The method for fabricating a solid electrolytic capacitor of this invention includes: forming an anode, forming a dielectric layer on the anode, and then forming a conjugated heteroaromatic polymer coating as a solid electrolyte on the dielectric layer with the above methods for forming a conjugated heteroaromatic polymer coating.

The anode may be formed from a valve metal composition. The valve metal composition may contain a valve metal (i.e., a metal that can be oxidized) or a valve metal-based compound, such as tantalum, niobium, aluminum, hafnium, titanium, alloys thereof, oxides thereof, nitrides thereof, and so on. Examples of the anode formed from valve metal oxides may include niobium oxide (e.g., NbO), tantalum oxide, etc.

The dielectric layer may be formed on the anode by anodizing the surface of the anode. Anodization is an electrical chemical process by which the metal of the anode is oxidized to form a material having a relatively high dielectric constant. For example, the surface of a tantalum anode may be anodized to form tantalum oxide ($Ta_2O_5$) surface layer, which has a dielectric constant "k" of about 27. For another example, the aluminum anode may be anodized to form an aluminum oxide ($Al_2O_3$) surface layer, which has a dielectric constant "k" of about 7 to 10.

To conduct anodization, the anode (e.g., Al metal foil) may be dipped into a weak acid solution at an elevated temperature that is supplied with a controlled amount of voltage and current to form a dielectric (e.g., $Al_2O_3$) surface layer having a certain thickness. The power supply may be initially kept at a constant current until the required formation voltage is reached. Thereafter, the power supply is kept at a constant voltage to ensure that the desired dielectric quality is formed over the surface of the anode (e.g., aluminum anode). The anodization voltage typically ranges from about 5 to about 700 volts.

Nevertheless, it is well known in the art that that the dielectric layer on the anode may be formed from other types of materials and using different techniques.

EXAMPLES

The following examples are intended to further explain this invention, but are not intended to limit the scope of this invention.

Examples Using Protic Acid

Example 1: Polymerization of a Neat Liquid of 2-bromo-3-(butylthio)-thiophene (BBTT) Catalyzed by Trifluoroacetic Acid (TFA)

A neat liquid of 2-bromo-3-(butylthio)thiophene (1.00 g; 3.98 mmol) was mixed with 1.65 equiv of trifluoroacetic acid (0.74 g; 6.49 mmol) in a single neck round bottom flask at room temperature (rt; 25° C.). After the addition, the colorless liquid first became red-brown liquid, and then turned into a dark blue gel within 5 minutes with the evolution of lot of smoke. The evolved smoke was confirmed by infrared spectrum to be a HBr gas, as shown in FIG. 1. The gel was not able to be stirred and was kept as such for 24 hours at room temperature. Then, the thick blue gel was dissolved in dichloromethane (20 mL), washed successively with ~5% aqueous sodium hydroxide solution (10 mL) and two times with water (10 mL each time). The resulting red-brown color solution was dried over anhydrous magnesium sulfate and concentrated in a rotavapor to get a thick red brown gummy solid in quantitative yield (0.66 g; ~100%). The obtained product was confirmed to be poly[3-(butylthio)thiophene] by NMR, IR, and UV-vis spectroscopies.

$^1$H NMR (CDCl$_3$, 600 MHz, TMS as δ=0 ppm): 7.43 (d, J=6.80 Hz), 7.38-7.36 (m), 7.32 (d, J=3.60 Hz), 7.22-7.21 (m), 7.05 (d, J=5.20), 7.00 (s), 2.93-2.71 (m, 2H), 1.66-1.63 (m, 2H), 1.47-1.42 (m, 2H), 0.92-0.83 (m, 3H).

IR (cm$^{-1}$): 3072, 2952, 2927, 2871, 1464, 1456, 1435, 1378, 1346, 1273, 1223, 1099, 915, 879, 831, 747, 714, 626, 474.

UV (measured in THF solution): absorption maximum at 465 nm.

$M_w$ was found to be 1147 with a polydispersity index (PDI) of 2.19, measured by GPC using polystyrene standards and THF eluent.

Example 2: Polymerization of BBTT Catalyzed by TFA in Toluene

A toluene (4.5 mL) solution of BBTT (1.50 g; 5.97 mmol) was polymerized with 0.5 equiv of trifluoroacetic acid (0.34 g; 3.98 mmol) in a single neck round bottom flask under nitrogen atmosphere at room temperature (rt; 25° C.). After the addition, the colorless solution became red-brown immediately, which then turned into a dark blue viscous solution within 30 minutes, with the evolution of lot of HBr smoke. After stirring for ~2.5 hours at room temperature, the viscous solution was worked up similarly as in Example 1 to give a red brown gummy poly[3-(butylthio)thiophene] in quantitative yield (1.05 g; ~100%). The obtained product was characterized similarly as in example 1. Both NMR and IR spectra are found to be essentially the same as the polymer obtained in Example 1, while UV absorption maximum appeared at 453 nm and $M_w$ was found to be 1588 with a polydispersity index (PDI) of 1.45.

The results of Examples 1 and 2 indicated that the polymerization method of this invention can be conducted in a neat liquid or in a solvent.

Example 3-10: Polymerization of BBTT by Using Different Types and Different Amounts of Acids The acid-catalyzed polymerization of BBTT are generally applicable to different types of protic acids, such as TFA and methanesulfonic acid (MSA), and to a wide range of acid amounts, such as ~0.1 to ~4 equiv, as summarized in Table 1. All the polymerization in Table 1 can undergo effectively at room temperature to give essentially quantitative yields (i.e., ~100%). The polymerizations in Examples 3-6 were done with neat liquid of BBTT, which turned into dark blue solids within 5-10 min after mixing with the specified amounts of acid (Table 1). The resulting solid masses were kept as such at room temperature for the reaction time as specified in Table 1, and then worked up as in Example 1.

The polymerizations in Examples 7-9 were also done initially with neat liquid of BBTT. In these cases the reaction mixtures all turned into dark blue solids within about 1 h, then 3 mL toluene was added into the each reaction mixture of Examples 7-9 at ~1 h to break up the solid masses and to keep stirring the resultant mixtures at room temperature for the whole reaction period. The polymerization of Example 10 was done totally in the toluene solution of BBTT from the very beginning. In this case, the reaction mixture turned into a solid at ~24 h. The characterization results for all the products, including UV-vis (absorption $λ_{max}$) and GPC ($M_w$ and PDI), are also summarized in Table 1. The solidifying time for each reaction mixture are recorded in the last column of Table 1. The GPC results indicated that the growths of the polymer chains were essentially frozen after the reaction mixtures had turned into a solid mass.

| Example No. | Acid | Acid qty (Equiv) | Solvent | Reaction time (h) | $λ_{max}$ (nm) | $M_w$ | PDI | Solidifying time |
|---|---|---|---|---|---|---|---|---|
| 3 | TFA | 3.87 | | 24 | 462 | 1725 | 1.89 | 5 min |
| 4 | MSA | 3.87 | | 24 | 466 | 1122 | 1.58 | 5 min |
| 5 | TFA | 0.50 | | 2 | 451 | 1285 | 1.98 | 10 min |
| 6 | MSA | 0.50 | | 2 | 447 | 1005 | 1.51 | 10 min |
| 7 | MSA | 0.22 | Toluene | 24 | 455 | 1100 | 1.51 | 1 h |
| 8 | TFA | 0.20 | Toluene | 17 | 460 | 1128 | 1.16 | 1 h |
| 9 | TFA | 0.10 | Toluene | 43 | 450 | 1314 | 1.38 | 1 h |
| 10 | TFA | 0.088 | Toluene | 24 | 462 | 3936 | 4.77 | 24 h |

The results of Examples 3-10 indicated that the reaction rate increases as the amount of the acid catalyst increased.

Example 11: Separation of the Oligomers and Polymers Obtained in Example 2

The red brown crude product obtained in Example 2 was purified by column chromatography using silica gel and separated into two different polymer components of different molecular weights. The loaded product was first eluted with hexane to remove the oligomers (such as dimer, trimer, and tetramer). Then, hexane/ethyl acetate (90:10) eluent was used to elute out the major polymer component. Then the minor polymer component was eluted with dichloromethane/THF (1:1). Both polymer components were confirmed to be the typical highly conjugated poly(3-butylthio-thiophene)s by NMR, IR, and UV-vis spectra. The GPC results indicated that the major polymer component ($M_w$~1170) has a very narrow PDI (~1.17), suggesting that it may have highly regioregular polymer backbone structure; while the minor polymer component ($M_w$~3533, PDI ~1.45) may be most likely yielded from these primary polymer chains via the same coupling reaction as induced by the acid catalyst.

Example 12: Continuous Growth of the Polymer Chains of poly[3-(butylthio)thiophene] (PBTT) from the Acid-Catalyzed Coupling Reaction Among the Existing Oligomers and/or Polymers Another polymerization of 2-bromo-3-(butylthio)thiophene (4.5 g) by TFA (0.5 equiv) was performed using the same reaction conditions as in Example 2, but in a three-fold increased scale. The polymerization was run at room temperature and its progress was closely monitored with thin-layer chromatography (TLC) test. The TLC results indicated that the monomers had been all consumed within the first 1 h; and the oligomers seemed to continue growing into higher molecular weight polymers with the reaction time even after the depletion of the monomer, but at a slower pace.

The polymerization was allowed to continue proceeding at room temperature, then one-third of reaction solution was sampled at the reaction time of 2.5 h, 13 h, and 21 h, respectively. All the sampled reaction solutions were working up immediately after their sampling, using the same procedure of Example 1. The GPC results indicated that both $M_w$ and PDI clearly increased with reaction time from 1264/1.66 ($M_w$/PDI for the 2.5 h product), through 3339/5.06 (for the 13 h product), to 5018/8.72 (for the 21 h product). The results clearly evidenced that the oligomers and polymers of BBTT originally formed from the monomers by the TFA acid-catalyst can also be activated by the same acid-catalyst to undergo further coupling reaction with other oligomers or polymers to form higher molecular weight polymers.

Example 13: Continuous Growth of the Polymer Chains of PBTT by Additional Feeding of Monomers BBTT (1.00 g; 3.98 mmol) was first polymerized with 0.2 equiv of trifluoroacetic acid (0.091 g) under $N_2$ at room temperature. After the addition of acid, the colorless liquid became red-brown immediately, which then turned into a dark blue viscous liquid in 10 min, with the evolution of lot of HBr smoke. The TLC test indicated that all the monomer had already been consumed. Then, to this reaction mixture a solution of fresh BBTT (1.00 g in 3.00 mL toluene) was added at room temperature in three equal portions, with each addition being separated by a time interval of ~10 min. The reaction solution was closely monitored by TLC tests to ensure that all the previously added monomers had been consumed before the addition of the new portion of monomer solution. At the overall reaction time of 2.5 h, the resulting blue viscous solution was worked up using the same procedure as in Example 1, to yield a tacky red brown solid in quantitative yield (1.35 g; ~100%). The $M_w$ was found by GPC to be 1216 with a PDI of 1.17, which is greater than the $M_w$ 1128 (PDI 1.16) for the polymer obtained with 0.2 equiv TFA (Example 8) without the additional feeding of the monomers.

The results of Examples 12-13 indicated that the existing polymer chains remained active even after the depletion of original monomer feed, and can effectively react again with the newly fed monomers to continue their growth. This indicates the possibility of this invention to produce an extremely high molecular weight polymer that may be used as an extra high mechanical strength material.

Comparative Example 1: Attempt to Polymerize 3-(butylthio)thiophene (BTT) with TFA A toluene (1.50 mL) solution of 3-(butylthio)thiophene (BTT; 0.50 g; 2.90 mmol) was added with 0.50 equiv TFA in a single neck round bottom flask under $N_2$ at room temperature. After the addition, the colorless solution gradually turned into red-brown. After stirring for 25 h at room temperature, the reaction mixture was worked up as in Example 1 to give a pale yellowish brown color liquid, which was found by NMR to contain >97% of the unreacted monomer BTT together with <3% of other byproducts. UV-vis spectrum showed $\lambda_{max}$ at ~272 nm, the same as the BTT monomer.

The results clearly indicated that the acid catalyst (TFA) along failed to induce the polymerization of BTT at room temperature for a long reaction period.

Comparative Example 2: Attempt to Polymerize 2,5-dibromo-3-(butylthio)thiophene (DBBTT) with TFA A toluene (1.50 mL) solution of 2,5-dibromo-3-(butylthio)thiophene (DBBTT; 0.50 g; 1.52 mmol) was added with 0.50 equiv TFA in a single neck round bottom flask under $N_2$ at 25° C. After the addition of TFA, the colorless solution turned gradually to pale green and remained the same even after stirring at room temperature for 25 h. TLC analysis revealed that the reaction solution contained essentially only the unreacted monomer, DBBTT. Then, the pale green solution was worked up as in Example 1 to get a pale yellow liquid that was confirmed by NMR to be the starting monomer DBBTT.

The result of this comparative example indicated that the acid catalyst (TFA) along totally failed to induce the polymerization of DBBTT at room temperature even for a long reaction period.

Example 14: The Use of BBTT Enables the Acid-Catalyzed Polymerization of BTT Under Mild Conditions A mixture of 2-bromo-3-(butylthio)thiophene (BBTT; 0.250 g; 0.995 mmol) and 3-(butylthio)thiophene (BTT; 0.25 g; 1.45 mmol) was added with 0.50 equiv TFA in a single neck round bottom flask under $N_2$ at room temperature. After the addition, the colorless solution turned brown and it was stirred for ~6 hours at room temperature. Then, the viscous brown solution was diluted by dichloromethane (10 mL) and worked up as in Example 1 to give a pale yellowish brown liquid in quantitative yield (0.42 g) with complete consumption of both BTT and BBTT. The GPC analysis showed that in addition to the polymer peak, it also contained two very large and broad peaks at the lower molecular weight side. The UV-vis spectrum for the product showed a much blue-shifted $\lambda_{max}$ at ~356 nm (with a tailing up to 575 nm), indicating that the majority of the products may be the dimer and trimer resulting from the reaction between BTT and the acid catalyst (which is somehow promoted by the presence of BBTT).

The result of this example indicated that the presence of the mono-brominated thiophene BBTT indeed help to promote the reactivity of the non-brominated BTT, leading to the complete consumption of BTT. However, the fast formation of the non-conjugated dimer and trimer from the reaction of BTT and the acid catalyst had seemed to compete significantly with acid-catalyzed polymerization from the mixture of BBTT and BTT, thus yielding a very complicated dimer/trimer/polymer mixture.

Example 15: Preparation of poly[3-(butylthio)thiophene] from a Mixture of 2-bromo-3-(butylthio) thiophene (BBTT) and 2,5-dibromo-3-(butylthio) thiophene (DBBTT)

A mixture of 2-bromo-3-(butylthio)thiophene (BBTT; 0.25 g; 0.995 mmol) and 2,5-dibromo-3-(butylthio)thiophene (DBBTT; 0.25 g; 0.76 mmol) was added with 0.50 equiv TFA (0.100 g; 0.88 mmol) in a single neck round bottom flask under $N_2$ at room temperature. After the addition, the colorless liquid turned into a purple viscous solution within 10 min with the evolution of lot of HBr smoke, which further turned into dark blue solids at room temperature within ~6 h. Then, the dark blue solid was dissolved in dichloromethane (20 mL) and worked up as in Example 1 to give red brown solid in quantitative yield (~0.33 g) with the complete consumption of both BBTT and DBBTT. The obtained product was confirmed to be poly(3-butythiothiophene) by NMR and IR. UV-vis spectrum showed the $\lambda_{max}$ at 453 nm, suggesting that it is a highly conjugated polymer. The GPC analysis showed a single component peak having $M_w$~1169 with a very narrow PDI (~1.19), indicating that both BBTT and DBBTT had been effectively copolymerized to form a single component polymer.

The results of this example indicated that the monobrominated thiophene, BBTT, served as an effective promoter to allow the acid-catalyzed polymerization of the di-brominated thiophene, DBBTT, to undergo effectively and quickly even at room temperature.

Example 16: Preparation of poly[3-(phenylthio) thiophene] (PPTT) from the Toluene Solution of 2-bromo-3-(phenylthio)thiophene (BPTT) Using Methanesulfonic Acid 2-Bromo-3-(phenylthio)thiophene (0.50 g; 1.844 mmol) was added with methanesulfonic acid (0.12 mL; 99% pure; d=1.481; 0.1772 g; 1.844 mmol; 1.00 equiv) in a single neck round bottom flask under nitrogen atmosphere at room temperature (25° C.). After the addition, the pale yellow liquid immediately turned into a red brown mixture, which then became green color thick in 1 h. Then, the thick mass was added with 3.00 mL of toluene and stirred overnight at room temperature. The resultant green color thick mass was dissolved in dichloromethane (20 mL), washed successively with ~5% aqueous sodium hydroxide solution (40.00 mL) and two times with water (20.00 mL each time). After the wash, the solution became red-brown, which was then dried over anhydrous magnesium sulfate and concentrated in a rotavapor to yield a thick gummy red brown color mass (0.35 g; ~99% yield). The obtained product was analyzed by UV-vis spectroscopy. The UV-vis (measured in THF solution) showed absorption maximum peaks at 332 nm and 466 nm.

The result of this example indicated that this invention is also extendable to the thiophene monomers with arylthio substituent group.

Examples 17-19: Preparation of poly(3-hexylthiophene) from 2-bromo-3-hexylthiophene (BHT) Using Different Acid Catalyst The polymerizations of 2-bromo-3-hexylthiophene (BHT; 0.50 g; 2.024 mmol) were performed using different protonic acids such as methanesulfonic acid (0.50 equiv), trifluoroacetic acid (1.0 equiv) and phosphoric acid (1.0 equiv) at room temperature. The results are summarized in the following Table.

| Example No. | Acid qty (equiv) | Polymerization Rate | Product | Yield | UV-vis $\lambda_{max}$ (nm) |
|---|---|---|---|---|---|
| 17 | $CH_3SO_3H$ (0.5) | Very fast; Forming green solids in 1 h | Polymer | >80% | 375 |
| 18 | $CF_3COOH$ (1.0) | Moderate; Became brown solution in 12 h | Polymer (minor) Oligomer (major) | >30% | 244 |
| 19 | $H_3PO_4$ (1.0) | Slow; Become pale yellow solution in 24 h | Oligomer | ~5% | — |

The results of these examples indicated that this invention is extendable to the thiophene monomers with alkyl substituent group.

Example 20: Preparation of poly(3-butoxythiophene) from the Toluene Solution of 2-bromo-3-butoxy-thiophene (BBOT) Using Trifluoroacetic Acid A solution of 2-bromo-3-butoxythiophene (0.50 g; 2.126 mmol) in 0.50 mL of toluene was added with 0.50 equiv trifluoroacetic acid (0.1212 g; 1.063 mmol) in a single neck round bottom flask under $N_2$ at room temperature. After the addition, the colorless liquid became first red-brown, then dark black solution within 5 min with the evolution of lot of smoke. The viscous solution was diluted with another 2.50 mL of toluene and stirred for 2.5 hours at room temperature. Then, the reaction solution was mixed with dichloromethane (20 mL) and then worked up as in Example 1 to get a tacky red brown solid in quantitative yield (0.3 g; 98%). The UV-vis spectrum (measured in THF solution) of the product showed $\lambda_{max}$ at 434 and 494 nm.

$^1$H NMR (CDCl$_3$, 600 MHz, TMS as δ=0 ppm): 7.42 (d, J=4.80 Hz), 7.38-7.36 (m), 7.32 (d, J=2.80 Hz), 7.22-7.20 (m), 7.05-7.04 (m), 7.00 (d, 2.00 Hz), 2.91-2.86 (m, 2H), 1.66-1.59 (m, 2H), 1.40-1.38 (m, 2H), 1.36-1.18 (b, 16H), 0.88-0.85 (m, 3H).

IR (cm$^{-1}$): 3073, 2953, 2925, 2853, 2872, 1531, 1465, 1455, 1434, 1417, 1377, 1346, 1301, 1211, 1190, 1082, 1026, 966, 880, 829, 720, 63, 472.

The result of this example indicated that this invention is extendable to the thiophene monomers with alkoxy substituent group.

Example 21: Preparation of Polypyrrole from 2-Bromopyrrole in Toluene Using TFA as the Catalyst A solution of 2-bromopyrrole (~0.20 g; 1.37 mmol) in 1.00 mL of toluene was added with 0.095 equiv trifluoroacetic acid (0.014 g; 0.0128 mmol) in a single neck round bottom flask under $N_2$ at room temperature. After the addition, the pale yellow solution became dark green solid mass with the evolution of lot of smoke. The green solid mass was kept as such for 1 h at room temperature. Then, the resultant reaction mass was mixed with methanol and filtered, which was dried to get 0.10 g of black solid, which was confirmed by IR to be polypyrrole. The black polypyrrole was found to be insoluble in most of the organic solvents. But, it was found to be able to dissolve in NMP after its reduction with hydrazine hydrate. The UV-vis for the soluble reduced polypyrrole was measured in its NMP solution, showing $\lambda_{max}$ at 400 nm and a shoulder at 480 nm with absorption tail till 900 nm.

IR ($cm^{-1}$): 1539, 1472, 1290, 1177, 1090, 1041, 966, 906, 865, 780.

The result of this example indicated that this invention is extendable to 2-substituted pyrrole ($X=NR^2$).

Example 22: Preparation of Polyfuran (PFu) from the Neat Liquid of 2-Bromofuran (BFu) Using Methanesulfonic Acid A solution of 2-bromofuran (~0.30 g; 2.06 mmol) was added with methanesulfonic acid (0.067 mL; 0.50 equiv) in a single neck round bottom flask under $N_2$ at room temperature (25° C.). After the addition, the pale yellow liquid became purple liquid with the evolution of lot of HBr smoke. After 5 min, the purple liquid changed into black thick stirrable mass and was continuously stirred for 24 h at room temperature. Then, the thick black mass was stirred with hexanes and decanted, which was dried to get 0.11 g of dark brown thick mass. The obtained polyfuran was analyzed by UV-vis spectroscopy in NMP solution to show a shoulder peak at ~400 nm with tailing absorption till 750 nm. The absorption features are similar to the copolymer prepared from BBTT and DBFu.

The result of this example indicated that this invention is extendable to 2-substituted furan (X=O).

Comparative Example 3: Reaction of 3,4-ethylenedioxythiophene (EDOT) with TFA to Give Non-Conjugated Dimer and Trimer of EDOT EDOT (0.50 g; 3.52 mmol) was mixed with 0.50 equiv TFA (0.2005 g; 1.76 mmol) in a single neck round bottom flask at room temperature under $N_2$. After the addition, the colorless liquid became purple and it was stirred at room temperature for 1.5 h. Then, the resulting brown solution was worked similarly as in Example 1, to give a brown color liquid. The obtained compounds were found by NMR to be the mixture of non-conjugated dimer and trimer (~40 mol %) together with the unreacted EDOT (~50 mol %), similar to the results previously reported in U.S. Pat. No. 6,891,016 B2. The UV-vis spectrum of the crude mixture showed $\lambda_{max}$ at 356 and 384 nm, consisting with the absorption characteristics of oligomers.

Comparative Example 4: Attempt to Polymerize 2,5-dibromo-3,4-ethylenedioxythiophene (DBEDOT) Using TFA as the Acid Catalyst A solution of DBEDOT (0.10 g; 0.336 mmol) in toluene (0.30 mL) was mixed with 0.50 equiv TFA (0.019 g; 0.167 mmol) in a single neck round bottom flask at room temperature under $N_2$. After the addition, the colorless solution became pale green, which remaining the same even after stirring at room temperature for 20 h. TLC analysis for the pale green reaction solution showed to have ~99% of unreacted DBEDOT ($R_f$=0.5; with an eluent of EA/hexane=5:95) plus ~1% oligomeric product ($R_f$<0.1). Then, the reaction solution was worked up as in Example 1 to give a pale yellow solid, which is confirmed to be essentially the unreacted DBEDOT by both $^1H$ and $^{13}C$ NMR spectra.

The result of these comparative examples indicated that a compound (1) with either Z=Y=H or with Z≠H and Y≠H cannot undergo polymerization with an acid catalyst.

Example 23: Preparation of poly(3,4-ethylenedioxythiophene) (PEDOT) from the Mixture of BEDOT and DBEDOT in Toluene with Trifluoroacetic Acid A solution of a mixture (0.50 g) of 2-bromo-3,4-ethylenedioxythiophene (BEDOT) and 2,5-dibromo-3,4-ethylenedioxythiophene (DBEDOT) (in the molar ratio of 24:76) in toluene (1.00 mL) was added with trifluoroacetic acid (0.0642 mL; 99% pure; d=1.48; 0.095 g; 0.834 mmol; 0.50 equiv) in a single neck round bottom flask at room temperature (25° C.) under $N_2$. After the addition, the colorless solution first became red-brown liquid, which then turned into a green color solution and slowly became blue color solution (in 1 h), with the evolution of lot of smoke. The stirrable thick solution was stirred for 24 h at room temperature, during which time lot of solid was precipitated. Then, the thick blue color heterogeneous mixture was mixed with dichloromethane (20 mL) and filtered to get a blue color solid (0.24 g; yield ~100%).

The obtained product was analyzed by UV-vis spectroscopy for both its reduced/undoped form and its oxidized/doped form. The reduced/undoped form of PEDOT was prepared by dissolving the above obtained blue solid in NMP following by the reduction with added hydrazine, which showed UV-vis (in NMP) spectrum with the absorption peak maximum at 468 nm and shoulder peaks at 441 and 496 nm, plus tailing absorption till ~900 nm. The oxidized/doped form of PEDOT was prepared by dissolving the above obtained blue solid in concentrated sulfuric acid, which showed UV-vis (in NMP) spectrum with a broad and strong absorption peak ranging from ~450 nm to ~1600 nm.

IR ($cm^{-1}$): 1650, 1511, 1474, 1395, 1338, 1225, 1146, 1091, 1052, 984, 936, 838, 695, 574, 523, 438.

Accordingly, the use of BEDOT enables the acid-catalyzed polymerization of DBEDOT under mild conditions. This indicated that the more reactive compound of formula (1) with Z=H and Y≠H can serve as the promoter for the acid-catalyzed polymerization of the less reactive compound of formula (1) with Z≠H and Y≠H.

Example 24: Preparation of poly(3,4-ethylenedioxythiophene) from the Mixture of 2-bromo-3,4-ethylenedioxythiophene (BEDOT), 3,4-ethylenedioxythiophene (EDOT), and 2,5-dibromo-3,4-ethylenedioxythiophene (DBEDOT)

A toluene (1.20 mL) solution of a mixture (0.39 g; 1.76 mmol) containing 2-bromo-3,4-ethylenedioxythiophene (BEDOT), 3,4-ethylenedioxythiophene (EDOT), and 2,5-dibromo-3,4-ethylenedioxythiophene (DBEDOT) in a ratio of 0.50:0.25:0.25 was mixed with 0.50 equiv TFA in a single neck round bottom flask at room temperature under $N_2$. After the addition, the colorless solution first became red-brown liquid, which then turned into a dark blue solid mass, within 5 minutes, with the evolution of lot of smoke. The solid mass was not able to stir and was kept as such for 3 h at room temperature. Then, the solid mass was mixed with methanol (20 mL) and filtered to get a blue color solid in quantitative yield (0.362 g) with the complete consumption of all three monomers. The obtained product was confirmed to poly(3,4-ethylenedioxythiophene) (PEDOT) by its IR spectrum.

The result of this example indicated that the presence of the mono-brominated EDOT (BEDOT) can indeed help to promote the acid-catalyzed polymerization of both non-brominated-EDOT (EDOT) and the dibrominated-EDOT (DBEDOT).

Examples Using Lewis Acid

Example 25: Preparation of poly[3-(butylthio)thiophene] from 2-bromo-3-(butylthio) Thiophene (BBTT) in Chloroform by Lewis Acid: Boron Trifluoride Etherate Complex A chloroform (1.00 mL) solution of 2-bromo-3-butylthiothiophene (BBTT; 0.50 g; 1.99 mmol) was added with 0.5 equiv boron trifluoride etherate in a single neck round bottom flask under $N_2$ at room temperature. The colorless solution turned into purple viscous solution immediately with the evolution of HBr gas. Then, the mixture was diluted with dichloromethane (20 mL) and worked up as in Example 1 to get a reddish-brown tacky solid in quantitative yield (0.33 g; ~98%). The UV-vis spectrum showed the $\lambda_{max}$ at 470 nm.

Example 26: Preparation of poly[3-(butylthio)thiophene] from 2-bromo-3-(butylthio) Thiophene (BBTT) in Chloroform by Lewis Acid: Ferric Chloride A chloroform (1.00 mL) solution of 2-bromo-3-(butylthio)thiophene (0.50 g; 1.99 mmol) was added to a black color slurry of ferric chloride (0.117 g; 0.50 equiv) in a single neck round bottom flask under $N_2$ atmosphere at room temperature. The colorless solution turned to purple immediately and then resulted in black precipitate within 5 minutes, and the resultant mixture was stirred for 24 h at room temperature. Then, the mixture was diluted with dichloromethane (20 mL) and worked up as in Example 1 to get a reddish-brown solid in excellent yield (0.32 g; ~95%). The UV-vis spectrum showed the $\lambda_{max}$ at 418 nm.

Example Using Polymeric Acid

Example 27: Preparation of PEDOT Film or Coating by In-Situ Polymerization of BEDOT Using Polymeric Acid, PSS, as the Sole Catalyst To a 25 mL cosolvent of acetone/$H_2O$ (v/v=1:1), a 5 mL 18 wt % aqueous solution of poly(styrenesulfonic acid) (PSS; d=1.11; $M_w$=75000) and a 1 mL THF solution containing 0.1 g of 2-bromo-3,4-ethylenedioxythiophene (BEDOT; 0.45 mmol) were added sequentially. After stirring for 5 minutes, the resultant colorless and transparent homogeneous solution was pour to a petri dish and cast into a free standing film in a vacuum oven. During the casting process, the colorless monomer solution turned into yellowish oligomer solution in ca. 2 h, and eventually resulting in a bluish-grey polymer film. The obtained film has a thickness of ca. 2 mm thick and a conductivity of ca. 0.07 S/cm, and can be readily dissolved into some polar solvents like water, methanol, and ethanol. Thin PEDOT coatings with great adhesion to the glass substrate and having much lighter bluish-grey coloring have also been successfully prepared, using a much smaller fraction of the above reaction solution.

Examples for Forming Copolymer

Example 28: Preparation of Copolymer of Thiophene/Pyrrole from the Monomer Mixture of 2-Bromo-3-(Butylthio)Thiophene (BBTT) and 2,5-Dibromopyrrole (DBPy) in Toluene Using TFA as the Catalyst 2-Bromo-3-(butylthio)thiophene (0.25 g; 0.9952 mmol) and 2,5-dibromopyrrole (~0.224 g; 0.9952 mmol) were dissolved in toluene (1.50 mL) and added with trifluoroacetic acid (0.177 g; 0.9952 mmol; 0.50 equiv) in a single neck round bottom flask at room temperature. After the addition, the pale yellow solution became dark blue and viscous with the evolution of lot of smoke. After stirring at room temperature for 9 h, the resulting solution was mixed with dichloromethane (20 mL) and worked up as in Example 1 to give 0.24 g of black solid, which was found to be highly soluble in NMP. The UV-vis spectrum (measured in NMP solution) for the copolymer of thiophene/pyrrole showed the $\lambda_{max}$ at 474 nm with the tailing absorption till 1000 nm.

Example 29: Preparation of Copolymer of Thiophene/Furan from the Monomer Mixture of 2-bromo-3-(butylthio)thiophene (BBTT) and 2,5-dibromofuran (DBFu) in Toluene (Hexane) Using TFA as the Catalyst 2-Bromo-3-(butylthio)thiophene (0.25 g; 0.9952 mmol) and 2,5-dibromofuran (~0.225 g; 0.9952 mmol) were dissolved in toluene (1.50 mL) and added with 0.50 equiv trifluoroacetic acid (0.177 g; 0.9952 mmol) in a single neck round bottom flask at room temperature. After the addition, the pale yellow solution slowly became dark blue viscous solution with the evolution of lot of smoke (took about one hour). The thick stirrable dark blue solution was stirred at room temperature for 17 h, which gradually turned into non-stirrable thick mass. The non-stirrable thick mass was kept as such for 24 hours at room temperature. Then, the thick blue mass was dissolved in dichloromethane (20 mL) and then worked up as in Example 1 to give a tacky brown solid in quantitative yield (0.29 g). The obtained product was analyzed by UV-vis spectroscopy. The UV (measured in THF solution) spectrum showed the absorption $\lambda_{max}$ at 356 nm with the tailing absorption till 700 nm.

Example 30: Preparation of Block Copolymer of Thiophene/Pyrrole from the Sequential Polymerization of 2-bromo-3-(butylthio)thiophene (BBTT) and 2,5-dibromopyrrole (DBPy) in Toluene Using TFA as the Catalyst 2-Bromo-3-(butylthio)thiophene (0.25 g; 0.9952 mmol) was added with trifluoroacetic acid (0.177 g; 0.9952 mmol; 0.50 equiv) in a single neck round bottom flask at room temperature. After the addition, the colorless liquid became red-brown liquid with the evolution of lot of smoke, indicating that the polymerization of BBTT had undergone significantly. After stirring for 10 min at room temperature, the TLC test for the reaction solution indicated that all the BBTT monomer had essentially been consumed. Then, a solution of 2,5-dibromopyrrole (~0.224 g; 0.9952 mmol) in toluene (1.50 mL) was added into the reaction mixture to provide the second monomer source. Right after the addition of DBPy, the brown reaction solution became dark blue with the evolution of lot of more smoke. After stirring at room temperature for another 30 min, the reaction mixture was worked up as in Example 1 to give 0.21 g of black solid, which was found to be insoluble in $CH_2Cl_2$ but highly soluble in NMP. The UV-vis spectrum (measured in NMP solution) showed $\lambda_{max}$ at 400 nm with the tailing absorption till 900 nm.

Example 31: Preparation of Block Copolymer of Thiophene/Furan from the Sequential Polymerization of 2-bromo-3-(butylthio)thiophene (BBTT) and 2,5-dibromofuran (DBFu) in Toluene Using TFA as the Catalyst 2-Bromo-3-(butylthio)thiophene (0.25 g; 0.9952 mmol) was added with 1.0 equiv trifluoroacetic acid (0.177 g; 0.9952 mmol) in a single neck round bottom flask at room temperature. After the addition, the colorless liquid became red-brown liquid with the evolution of lot of smoke and was stirred for 10 min at room temperature. The thick brown solution was then added with 2,5-dibromofuran (~0.225 g; 0.9952 mmol) in toluene (1.50 mL). After the addition, the thick brown solution became dark blue viscous solution with the continuous evolution of even more smoke. The thick stirrable dark blue solution was stirred at room temperature for 17 h. Then, the thick dark blue solution was mixed with dichloromethane (20 mL) and worked up as in Example 1 to give a tacky greenish-brown solid in quantitative yield (0.33 g). The obtained product was analyzed by UV-vis spectroscopy. The UV spectrum (in THF solution) showed an absorption $\lambda_{max}$ at 442 nm with the tailing absorption till 700 nm.

Example 32: Preparation of Polythiophene Copolymer from the Monomer Mixture of 2-bromo-3-(butylthio)thiophene (BBTT) and 2,5-dibromo-3,4-ethylenedioxy Thiophene (DBEDOT) in Toluene Using TFA as the Catalyst 2-Bromo-3-(butylthio)thiophene (BBTT; 0.25 g; 0.9952 mmol) and 2,5-dibromo-3,4-ethylenedioxythiophene (DBEDOT: 0.298 g; 0.9952 mmol) were dissolved in toluene (1.5 mL) and added with 0.5 equiv trifluoroacetic acid (0.114 g; 0.995 mmol) in a single neck round bottom flask at room temperature. After the addition, the pale yellow solution turned into dark blue viscous solution with the evolution of lot of smoke. After stirring at room temperature for 9 h, the reaction solution mixed with dichloromethane (20 mL) and worked up as in Example 1 to get 0.20 g red brown solid (soluble in $CH_2Cl_2$) and 0.05 g black solid (insoluble in $CH_2Cl_2$, but highly soluble in NMP). The UV-vis (in NMP solution) spectra showed the $\lambda_{max}$ at ~499 nm for the $CH_2Cl_2$-soluble product and at 506 nm for the NMP-soluble product.

Since both products showed significantly red-shifted UV-vis $\lambda_{max}$, as compared with the poly(3-butylthio-thiophene) prepared from BBTT under similar conditions, the results clearly suggest that both the $CH_2Cl_2$-soluble and $CH_2Cl_2$-insoluble products are the indeed the copolymers formed from BBTT and BEDOT. The results also indicated that the copolymers obtained in this example showed much better solubility than the homopolymer of PEDOT prepared from 2-bromo-3,4-ethylene-dioxythiophene (BEDOT) under similar conditions (which was insoluble in $CH_2Cl_2$ and only slightly soluble in NMP).

Example 33: Preparation of Diblock Copolymer of Polythiophenes from the Sequential Polymerization of 2-bromo-3-(butylthio)thiophene (BBTT) and 2,5-dibromo-3,4-ethylenedioxythiophene (DBEDOT) in Toluene Using TFA as the Catalyst 2-Bromo-3-(butylthio)thiophene (BBTT; 0.25 g; 0.9952 mmol) was added with trifluoroacetic acid (0.0.114 g; 0.9952 mmol) in a single neck round bottom flask at room temperature. After the addition, the colorless liquid became red-brown viscous liquid immediately together with the evolution of lot of smoke, indicating that the polymerization of BBTT had undergone significantly. After stirring for 10 min at room temperature, the TLC test for the reaction solution indicated that all the BBTT monomer had essentially been consumed. Then, a solution of 2,5-dibromo-3,4-ethylenedioxythiophene (DBEDOT; 0.298 g; 0.9952 mmol) in toluene (1.50 mL) was added into the reaction mixture to provide the second monomer source. Right after the addition of DBEDOT, the brown reaction solution became dark blue with the evolution of lot of more smoke.

After stirring at room temperature for another 30 min, the reaction solution started to yield lots solid precipitates. To prevent all the products turned into poorly soluble PEDOT, the reaction mixture was worked up immediately, following the procedure as used in Example 32 to get $CH_2Cl_2$-soluble red brown solid (0.15 g) and $CH_2Cl_2$-insoluble black solid (0.124 g). The black solid was found to be highly soluble in NMP. The obtained products were analyzed by UV-vis spectroscopy. The UV-vis spectrum (measured in NMP solution) for the $CH_2Cl_2$-soluble product showed the $\lambda_{max}$ at ~447 nm, similar to that for the homopolymer of poly(3-butylthio-thiophene) prepared under similar conditions. Thus, this red brown product can be attributed to the polymer chains having essentially the initial poly(3-butylthio-thiophene) block.

Interestingly, the UV-vis spectrum for the $CH_2Cl_2$-insoluble (NMP-soluble) product showed a twin $\lambda_{max}$ at 470 and 498 nm, which may be attributed to the absorption characteristic associated, respectively, with the poly[3-(butylthio)thiophene]block and poly(3,4-ethylenedioxythiophene) block of the resultant diblock copolymer chains. The results clearly proved that a diblock copolymer of BBTT and DBEDOT can be indeed prepared using the sequential polymerization method of this Example.

Example 34: Preparation of Copolymer of Thiophene/Furan/Pyrrole from the Monomer Mixture of 2-bromo-3-(butylthio)thiophene, 2,5-dibromofuran, and 2,5-dibromopyrrole in Toluene Using Trifluoroacetic Acid 2-Bromo-3-(butylthio)thiophene (0.25 g; 0.9952 mmol), 2,5-dibromofuran (0.225 g; 0.9952 mmol) and 2,5-dibromopyrrole (~0.224 g; 0.9952 mmol) were dissolved in toluene (1.50 mL) and added with trifluoroacetic acid (0.17 g; 0.9952 mmol; 0.50 equiv) in a single neck round bottom flask at room temperature. After the addition, the pale yellow solution became dark blue viscous solution with the evolution of lot of smoke. The thick stirrable dark blue solution was stirred at room temperature for 9 h. Then, 20 mL dichloromethane was added, trying to dissolve the dark blue thick mass. Part of the product was found to be insoluble in dichloromethane during the dissolution of the dark blue mass. The insoluble product was collected by filtration and dried to get 0.36 g of black solid, which however was found to be highly soluble in NMP solvent. The above $CH_2Cl_2$ filtrate was worked up as in Example 1 to give a tacky greenish-brown solid (0.11 g). The copolymeric products were analyzed by UV-vis spectroscopy. The UV-vis spectrum for the $CH_2Cl_2$-insoluble black solid (measured in NMP) showed $\lambda_{max}$ at 578 nm with the tailing extension till 900 nm, confirming the formation of copolymers. While, $CH_2Cl_2$-soluble greenish-brown solid showed the $\lambda_{max}$ at 422 nm, with the tailing absorption extended up to 900 nm.

Example 35: Preparation of Triblock-Copolymer of Thiophene/Furan/Pyrrole from the Sequential Polymerization of 2-bromo-3-(butylthio)thiophene, 2,5-dibromofuran, and 2,5-dibromopyrrole from their Toluene Solution Using Trifluoroacetic Acid 2-Bromo-3-(butylthio)thiophene (0.25 g; 0.995 mmol) was added with trifluoroacetic acid (0.177 g; 0.995 mmol; 0.50 equiv) in a single neck round bottom flask at room temperature. After the addition, the colorless liquid became red-brown liquid with the evolution of lot of HBr smoke and was stirred for 10 min at room temperature. The thick brown color mass was then added with 2,5-dibromofuran (~0.225 g; 0.9952 mmol) in toluene (1.50 mL). After the addition, the thick brown color mass became dark green color thick mass with the evolution of lot of smoke.

The thick stirrable dark green color mass was stirred at room temperature for 30 min and then 2,5-dibromopyrrole (~0.224 g; 0.9952 mmol) in toluene (1.50 mL) was added to the green color stirrable thick mass. The resulting mixture was stirred at room temperature for 17 h. Then, the thick dark blue color mass was dissolved in dichloromethane (20 mL), washed successively with ~5% aqueous sodium hydroxide solution (10.00 mL) and two times with water (10.00 mL each time). Part of the product was found to be insoluble in dichloromethane during the dissolution of the dark blue color mass. The insoluble product was filtered and dried to get 0.38 g (~123%) of black color solid as our block-copolymer product, which was found to be soluble in NMP solvent. The filtrate red brown solution was dried over anhydrous magnesium sulfate and concentrated in a rotavapor to get a thick gummy greenish-brown color mass (0.12 g). The obtained products were analyzed by UV-vis spectroscopy. Absorption maximum (measured in NMP) for $CH_2Cl_2$-insoluble portion was at 372 nm with the tailing extension till 900 nm; while the $CH_2Cl_2$-soluble portion was at 452 nm.

Example 36: Preparation of poly[3-(dodecylthio) thiophene] (PDDTT) from the Toluene Solution of 2-bromo-3-(dodecylthio)thiophene (BDDTT) Using Trifluoroacetic Acid A solution of 2-bromo-3-(dodecylthio)thiophene (0.50 g; 1.38 mmol) was added with trifluoroacetic acid (0.053 mL; 99% pure; d=1.48; 0.785 g; 0.6883 mmol; 0.50 equiv) in a single neck round bottom flask under $N_2$ at room temperature (25° C.). After the addition, the reaction mixture became biphasic solution and became thick blue solid after 1.5 h with the evolution of lot of smoke. Then, the blue color solid was added with 1.5 mL of toluene and stirred at room temperature for 24 h. Then, the thick blue color mass was dissolved in dichloromethane (20 mL), washed successively with ~5% aqueous sodium hydroxide solution (40 mL) and two times with water (20 mL each time). The resulting red-brown color solution was dried over anhydrous magnesium sulfate and concentrated in a rotavapor to get a thick gummy red brown mass (0.37 g; ~96% in yield). The obtained product was confirmed to be poly[3-(dodecylthio) thiophene] by NMR, IR, and UV-vis spectroscopies. The UV-vis (in THF solution) absorption peak maximum is at 468 nm.

$^1$H NMR (CDCl$_3$, 600 MHz, TMS as $\delta$=0 ppm): 7.04-7.06 (m), 6.99 (s), 6.94 (s), 6.87-6.86 (b), 4.16-4.14 (m, 2H), 1.86 (b, 2H), 1.57 (b, 2H), 1.01 (b, 3H).

IR (cm$^{-1}$): 3108, 3096, 2959, 2933, 2872, 1660, 1616, 1568, 1557, 1549, 1539, 1463, 1456, 1430, 1350, 1261, 1191, 1174, 1145, 1123, 1079, 1042, 967, 933, 898, 808, 711, 685, 644, 618, 463.

Example 37: Preparation of Block-Copolymer of Thiophene/Furan from the Sequential Polymerization of 2-bromo-3-(butylthio)thiophene and 2-bromofuran in Toluene Using Trifluoroacetic Acid 2-Bromo-3-(butylthio)thiophene (0.25 g; 0.995 mmol) was added with trifluoroacetic acid (0.08 mL; 99% pure; d=1.48; 0.114 g; 0.995 mmol; 0.50 equiv) in a single neck round bottom flask at room temperature (rt; 25° C.). After the addition, the colorless liquid became red-brown liquid with the evolution of lot of smoke and was stirred for 10 min at room temperature. The thick brown color mass was then, added with 2-bromofuran (~0.15 g; 0.995 mmol) in toluene (1.0 mL). After the addition, the thick brown color mass became dark blue color thick mass with the evolution of lot of HBr smoke. The thick stirrable dark blue color mass was stirred at room temperature for 24 h. Then, the thick dark blue color mass was dissolved in dichloromethane (20 mL), washed successively with ~5% aqueous sodium hydroxide solution (10 mL) and two times with water (10 mL each time). The resulting red brown color solution was dried over anhydrous magnesium sulfate and concentrated in a rotavapor to get a thick gummy red brown color mass (0.24 g; ~100% yield). The obtained product was analyzed by UV-vis spectroscopy to show an absorption $\lambda_{max}$ at 457 nm.

Example Using Dimeric Thiophene Compound

Example 38: Preparation of poly[3-(2-pyridylthio)-2,2'-bithiophene] (PPTBT) from the Toluene Solution of 5'-bromo-3-(2-pyridylthio)-2,2'-bithiophene (BPTBT) Using Trifluoromethanesulfonic Acid 5'-bromo-3-(2-pyridylthio)-2,2'-bithiophene

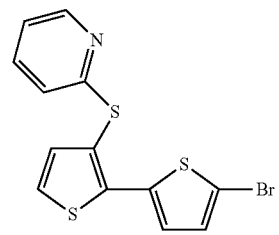 [SMILES: Brc1ccc(-c2sccc2Sc2ccccn2)s1]

A solution of 5'-bromo-3-(2-pyridlthio)-2,2'-bithiophene (BPTBT, 0.50 g; 1.4112 mmol) in toluene (1.00 mL) was added with trifluoromethanesulfonic acid (0.372 mL; 99% pure; d=1.708; 0.635 g; 4.23 mmol; 3.00 equiv) in a single neck round bottom flask at room temperature (25° C.) under nitrogen atmosphere. After the addition, the pale green color solution first became red-brown liquid, which then turned into a blue-green color solution and slowly became dark blue color solution (in 1 h), with the evolution of lot of smoke. The stirrable thick solution was stirred for 24 h at room temperature, during which time solid was precipitated and the mixture became heterogeneous. The resultant reaction mixture was dissolved in dichloromethane (20 mL) and the insoluble portion in dichloromethane was filtered. The filtrate was washed successively with ~5% aqueous sodium hydroxide solution (40 mL) and two times with water (20 mL each time). The washed red-brown color solution was dried over anhydrous magnesium sulfate and concentrated in a rotavapor to get a red brown color solid (0.39 g; ~101%). The obtained dichloromethane soluble (red color solid) and insoluble portions (brown color, 0.07 g) were both analyzed by UV-vis spectroscopy (in their THF solutions), showing similar spectra with the absorption maximum peaks appearing at ~352 nm and ~465 nm.

The result of this example indicated that the invention is indeed extendable to the polymerization of a compound of formula (2) with Z=H and Y≠H. The polyheteroaromatic yielded in this example represent a typical alternative copolymer.

Example 39: Preparation of poly(3-butylthiothiophene) (PBTT) from 2-chloro-3-butylthiothiophene (CBTT) at 100° C. with Trifluoromethanesulfonic Acid (TFMSA)

A solution of CBTT (0.50 g; 2.42 mmol) in 1.50 mL of 1,1,2,2-tetrachloroethane (TCE) was heated to 100° C. and added with trifluoromethanesulfonic acid (0.011 mL; 99% pure; d 1.696; 0.018 g; 0.121 mmol; 0.05 equiv) in a single neck round bottom flask under nitrogen atmosphere. After the addition, the colorless liquid turned into a dark blue color solution with the evolution of lot of smoke. The thick mass was stirred at 100° C. for 24 h. Then, the thick blue color mass was cooled to rt and diluted with dichloromethane (3 mL). The diluted mass was added with 3 drops of hydrazine hydrate, stirred at rt for 2 h and added slowly into 200 mL of methanol containing 1 mL of hydrazine hydrate. The resulting red-brown color precipitate was stirred at rt for 6 h and filtered, washed with methanol and dried under vacuum. The product was obtained as a brown color solid in 78% yield (0.32 g) and it was confirmed to be poly(3-butythiothiophene) by NMR study. $\delta_H$ (400 MHz; CDCl$_3$; Me$_4$Si): 7.44 (br s), 7.41-7.36 (br m), 7.23-7.21 (br m), 7.06-7.01 (br m), 2.95-2.86 (br m, 2H), 1.66-1.60 (br m, 2H), 1.47-1.46 (br m, 2H), 0.93-0.91 (br m, 3H). $\lambda_{max}$ (chloroform)/nm 500.

The result of this example indicated that the invention is indeed extendable to the polymerization of a compound of formula (1) with Z=H and Y=Cl.

Example 40: Preparation of Polythiophene (PT) from 2-bromothiophene (BT) at 100° C.

A solution of BT (0.395 g; 2.42 mmol) in 1.50 mL of 1,1,2,2-tetrachloroethane (TCE) was heated to 100° C. and added with trifluoromethanesulfonic acid (0.022 mL; 99% pure; d 1.696; 0.036 g; 0.242 mmol; 0.1 equiv) in a single neck round bottom flask under nitrogen atmosphere. After the addition, the colorless liquid turned into a greenish blue solution with the evolution of lot of smoke. The thick mass was stirred at 100° C. for 24 h, yielding dark red insoluble precipitates with a yield of >90%.

The result of this example indicated that the invention is indeed extendable to the polymerization of a compound of formula (1) with $R^1$=H.

Example 41: Effectiveness of Various Retardants for the 1 M CHCl$_3$ Solution of BBTT with 0.05 Equiv. of Methanesulfonic Acid as the Acid Catalyst The test results for the effectiveness of various reagents (in 0.1 equiv. to the monomer) in retarding the polymerization of the monomer BBTT solution (1 M in CHCl$_3$) containing 0.05 equiv. of methanesulfonic acid catalyst are summarized in the following Table. The observations were taken at 3 h and at 12 h, respectively. In absence of the retardant additive, the polymerization underwent immediately to yield a dark red-brown solution. While, in the presence of only 0.1 equiv. of retardant, most of the retardants effectively slowed down the polymerization to maintain the solution mixture in the colorless state for more than 3 hours.

| Retardant | 3 h | 12 h |
|---|---|---|
| MeOH | ○ | X |
| EtOH | ○ | X |
| Acetone | X | X |
| Ether | X | X |
| THF | ○ | ○ |
| 1,4-Dioxane | ○ | X |
| EA | ○ | X |
| DMF | ○ | ○ |
| NMP | ○ | ○ |
| Acetonitrile | X | X |
| DMSO | ○ | ○ |

○: remaining colorless; X: polymerization started.

Example 42: Effectiveness of Various Retardants (0.2 Equiv) for the 1 M CHCl$_3$ Solution of BBTT with 0.1 Equiv. of Trifluoroacetic Acid as the Acid Catalyst The test results for the effectiveness of various reagents (in 0.2 equiv. to the monomer) in retarding the polymerization of the monomer BBTT solution (1 M in CHCl$_3$) containing 0.1 equiv. of trifluoroacetic acid catalyst are summarized in the following Table. The observations were taken at 3 h and at 12 h, respectively. In absence of the retardant additive, the polymerization initiated immediately to yield a dark red-brown solution. While, in the presence of only 0.2 equiv. of retardant, most of the tested retardants effectively slowed down the polymerization to maintain the solution mixture in the colorless state for more than 12 hours.

| Retardant | 3 h | 12 h |
|---|---|---|
| H$_2$O | ○ | ○ |
| MeOH | ○ | ○ |
| Acetone | ○ | ○ |
| Ether | ○ | ○ |
| Ethylene carbonate | ○ | ○ |
| HMPA | ○ | ○ |

-continued

| Retardant | 3 h | 12 h |
|---|---|---|
| Acetonitrile | ○ | ○ |
| Dimethyl sulfide | ○ | X |

○: remaining colorless; X: polymerization started.

The results of Examples 41 and 42 indicated that when a monomer with a moderate basicity like BBTT were used, the same retardants worked more effectively to retard the polymerization if a weaker acid like trifluoroacetic acid (Example 42) was used as the acid catalyst, instead of a stronger acid like methanesulfonic acid (Example 41).

Example 43: Effectiveness of Various Retardants for 1 M Ether Solution of BEDOT with 0.05 Equiv. of Methanesulfonic Acid The test results for the effectiveness of various reagents (in 0.1 equiv. to the monomer) in retarding the polymerization of the monomer BEDOT solution (1 M in ether) containing 0.05 equiv. of methanesulfonic acid catalyst are summarized in the following Table. The observations were taken at 3 h and at 12 h, respectively. In absence of the retardant additive, the polymerization underwent immediately to yield a dark blue solution. While, in the presence of only 0.1 equiv. of retardant, most of the retardants effectively slowed down the polymerization to maintain the solution mixture in the colorless state for more than 3 hours.

| Retardant | 3 h | 12 h |
|---|---|---|
| Acetone | ○ | X |
| Ether | X | X |
| THF | ○ | X |
| 1,4-Dioxane | X | X |
| EA | ○ | X |
| DMF | ○ | ○ |
| NMP | ○ | ○ |
| Acetonitrile | X | X |
| NEt$_3$ | ○ | ○ |
| DMSO | ○ | X |
| PPh$_3$ | ○ | X |

○: remaining colorless; X: polymerization started.

The results of Example 43 (when compared with the results of Examples 41 and 42) indicated that when the reaction mixture contained a relatively strong basic monomer like BEDOT and a relatively strong acid catalyst like methanesulfonic acid, only those retardants with a stronger basicity (such as the N-containing compounds like DMF, NMP, and NEt$_3$ in the above Table) can work as a long term retardation agent.

Example 44. Effectiveness of Various Polymerization Retardants (0.2 Equiv) for the Neat Liquid of BBTT with 0.1 Equiv. of Trifluoroacetic Acid as the Acid Catalyst

| Retardant | 3 h | 12 h |
|---|---|---|
| MeOH | ○ | ○ |
| Acetone | ○ | ○ |
| Acetonitrile | ○ | ○ |

○: remaining colorless; X: polymerization started.

The results in this example indicated that the composition with an effective retardant can work even for a neat monomer with the monomer concentration as high as >94 wt %. Even higher monomer concentration (e.g. ~99 wt %) can be applied if a lesser amount of acid catalyst (e.g., 0.01 equiv.) and polymerization retardant (e.g., 0.02 equiv.) are used.

Examples for Making Aluminum Solid Electrolyte Capacitors

Example 45

An anode aluminum foil having an Al$_2$O$_3$ dielectric layer formed at an electrochemical forming voltage of 8 V and a cathode aluminum foil of high surface area prepared by an electrochemical corrosion were wounded together with an interposed separator to form a solid electrolytic capacitor element. After the electrochemical reforming treatment in an organic acid solution to repair the damaged dielectric layer, the capacitor element was dipped in a composition containing 2-bromo-3-butylthiothiophene (2 M; 1 equiv.; as the monomer), methanesulfonic acid (0.05 equiv.; as the acid catalyst), chloroform (1 mL; as the solvent), THF (1 equiv., as the polymerization retardant) for 10 minutes. Then, the polymerization was performed by heating the dipped capacitor element at 60° C. for 30 minutes following by heating at 105° C. in a vacuum chamber to drive the polymerization to completion. The static capacitance was measured to be 120 ρF.

Example 46

The same blank aluminum capacitor element as used in example 45 was dipped with a composition containing 2-bromo-3,4-ethylenedioxythiophene (2 M; 1 equiv.; the monomer), methanesulfonic acid (0.1 equiv.; as the acid catalyst), chloroform (1 mL; as the solvent), THF (0.5 equiv., as the polymerization retardant) for 10 minutes. Then, the polymerization was performed by heating the dipped capacitor element at 60° C. for 30 minutes following by heating at 105° C. in a vacuum chamber to drive the polymerization to completion. The static capacitance was measured to be 160 ρF.

Example 47

The same blank aluminum capacitor element as used in example 45 was dipped with a composition containing 2-bromo-3,4-ethylenedioxythiophene (2 M; 1 equiv.; the monomer), methanesulfonic acid (0.1 equiv.; as the acid catalyst), chloroform (1 mL; as the solvent), ethyl acetate (1.0 equiv., as the polymerization retardant), poly(methyl methacrylate) (0.1 equiv.; as a polymer binder and as well as a polymerization retardant) for 10 minutes. Then, the polymerization was performed by heating the dipped capacitor element at 60° C. for 30 minutes following by heating at 105° C. in a vacuum chamber to drive the polymerization to completion. The same polymerization and coating treatment performed in the above was repeated for two times. The final static capacitance was measured to be 218 μF.

Example 48

The same blank aluminum capacitor element as used in example 45 was dipped with a composition containing 2-bromo-3,4-ethylenedioxythiophene (2 M; 1 equiv.; the monomer), perfluorooctanoic acid (0.15 equiv.; as the acid catalyst), chloroform (1 mL; as the solvent), ethyl acetate (1.0 equiv., as the polymerization retardant), poly(methyl methacrylate) (0.1 equiv.; as a polymer binder and as well as a polymerization retardant) for 10 minutes. Then, the polymerization was performed by heating the dipped capacitor element at 60° C. for 30 minutes following by heating at 105° C. in a vacuum chamber to drive the polymerization to completion. The static capacitance was measured to be 224 µF; the dissipation factor (DF) is 1.9; 100 Hz and 100 kHz equivalent series resistances (ESR) are 13.7 and 7.6 m, respectively.

This invention has been disclosed above in the preferred embodiments, but is not limited to those. It is known to one skilled in the art that some modifications and innovations may be made without departing from the spirit and scope of this invention. Hence, the scope of this invention should be defined by the following claims.

What is claimed is:

1. A capacitor, comprising a conjugated heteroaromatic polymer that is transitional metal free and is prepared directly on a substrate of the capacitor from a composition comprising:

at least one compound of formula (1) or (2) as a monomer,

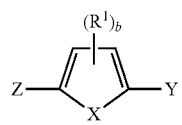

wherein in formula (1),
X is selected from the group consisting of S, O, Se, Te, $PR^2$ and $NR^2$, wherein $R^2$ is selected from the group consisting of hydrogen, and substituted and unsubstituted alkyl, aryl, heteroaryl, alkanoyl, and aryloyl groups,
Y is hydrogen (H), or a precursor of a good leaving group $Y^-$ whose conjugate acid (HY) has a $pK_a$ of less than 30,
Z is hydrogen (H), silyl, or a precursor of a good leaving group $Z^-$ whose conjugate acid (HZ) has a $pK_a$ of less than 30,
b is 0, 1 or 2, and
each $R^1$ is a substituent, wherein when b=2, the two $R^1$ are the same or different and may joint together to form a ring;
the at least one compound of formula (1) comprises at least one compound of formula (1) with Z=H and Y≠H;

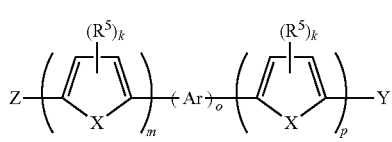

in formula (2),
X is the same or different at each occurrence, and is independently selected from the group consisting of S, O, Se, Te, $PR^2$ and $NR^2$, wherein $R^2$ is selected from the group consisting of hydrogen, and substituted and unsubstituted alkyl, aryl, heteroaryl, alkanoyl, and aryloy groups, Y is hydrogen (H), or a precursor of a good leaving group $Y^-$ whose conjugate acid (HY) has a $pK_a$ of less than 30,
Z is hydrogen (H), silyl, or a precursor of a good leaving group $Z^-$ whose conjugate acid (HZ) has a $pK_a$ of less than 30,
Ar is a substituted or unsubstituted, mono- or polynuclear, aryl or heteroaryl ring,
m, o and p are each independently an integer equal to or greater than 0, with a proviso that m+p≥1,
each k is independently 0, 1 or 2,
each $R^5$ is a substituent, wherein any two $R^5$ on the same ring or on two neighboring rings, or $R^5$ and a substituent group on a neighboring Ar ring, may join together to form another ring; and
the at least one compound of formula (2) comprises at least one compound of formula (2) with Z=H and Y≠H;
an acid as a polymerization catalyst selected from the group consisting of a protic acid, a polymeric acid, and a non-transitional Lewis acid; and
at least one functional component, selected from the group consisting of a solvent, a polymerization retardant, a polymer binder, a dopant, a dielectric layer protection agent, a plasticizer, an impact modifier, and a crosslinking agent,
wherein the conjugated heteroaromatic polymer contains, as a dopant therefor, the acid as the polymerization catalyst.

2. The capacitor of claim 1, wherein the at least one functional component contains at least a polymerization retardant comprising at least one Lewis base having a stronger basicity than the monomer, and
when the polymerization retardant comprises a carbonate, the carbonate is selected from dimethyl carbonate, ethylene carbonate, and propylene carbonate.

3. The capacitor of claim 1, wherein the at least one functional component contains at least a polymerization retardant, and the polymerization retardant comprises a polymer retardant.

4. A solution for forming an electroactive coating, containing a conjugated heteroaromatic polymer, being transitional metal free, and being prepared directly from a composition comprising:

at least one compound of formula (1) or (2) as a monomer,

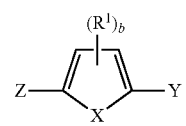

wherein in formula (1),
X is selected from the group consisting of S, O, Se, Te, $PR^2$ and $NR^2$, wherein $R^2$ is selected from the group consisting of hydrogen, and substituted and unsubstituted alkyl, aryl, heteroaryl, alkanoyl, and aryloyl groups,
Y is hydrogen (H), or a precursor of a good leaving group $Y^-$ whose conjugate acid (HY) has a $pK_a$ of less than 30,
Z is hydrogen (H), silyl, or a precursor of a good leaving group $Z^-$ whose conjugate acid (HZ) has a $pK_a$ of less than 30,
b is 0, 1 or 2, and each R¹ is a substituent, wherein when b=2, the two R¹ are the same or different and may joint together to form a ring;

the at least one compound of formula (1) comprises at least one compound of formula (1) with Z=H and Y≠H;

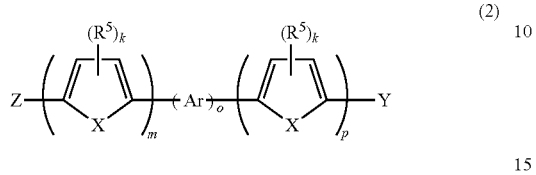

in formula (2),

X is the same or different at each occurrence, and is independently selected from the group consisting of S, O, Se, Te, PR² and NR², wherein R² is selected from the group consisting of hydrogen, and substituted and unsubstituted alkyl, aryl, heteroaryl, alkanoyl, and aryloy groups, Y is hydrogen (H), or a precursor of a good leaving group Y⁻ whose conjugate acid (HY) has a pK$_a$ of less than 30, Z is hydrogen (H), silyl, or a precursor of a good leaving group Z⁻ whose conjugate acid (HZ) has a pK$_a$ of less than 30, Ar is a substituted or unsubstituted, mono- or polynuclear, aryl or heteroaryl ring, m, o and p are each independently an integer equal to or greater than 0, with a proviso that m+p≥1, each k is independently 0, 1 or 2, each R⁵ is a substituent, wherein any two R⁵ on the same ring or on two neighboring rings, or R⁵ and a substituent group on a neighboring Ar ring, may join together to form another ring; and the at least one compound of formula (2) comprises at least one compound of formula (2) with Z=H and Y≠H;

an acid as a polymerization catalyst selected from the group consisting of a protic acid, a polymeric acid, and a non-transitional Lewis acid; and at least one functional component, selected from the group consisting of a solvent, a polymerization retardant, a polymer binder, a dopant, a dielectric layer protection agent, a plasticizer, an impact modifier, and a crosslinking agent, wherein the at least one functional component contains at least a polymerization retardant comprising at least one Lewis base having a stronger basicity than the monomer, when the polymerization retardant comprises a carbonate, the carbonate is selected from dimethyl carbonate, ethylene carbonate, and propylene carbonate, and the conjugated heteroaromatic polymer contains, as a dopant therefor, the acid as the polymerization catalyst.

5. An electroactive coating prepared directly from the solution of claim 4.

6. An electroactive coating, comprising a conjugated heteroaromatic polymer that is transitional metal free and is prepared from a composition comprising:

at least one compound of formula (1) or (2) as a monomer,

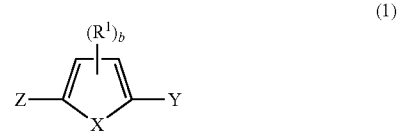

wherein in formula (1),

X is selected from the group consisting of S, O, Se, Te, PR² and NR², wherein R² is selected from the group consisting of hydrogen, and substituted and unsubstituted alkyl, aryl, heteroaryl, alkanoyl, and aryloyl groups, Y is hydrogen (H), or a precursor of a good leaving group Y⁻ whose conjugate acid (HY) has a pK$_a$ of less than 30, Z is hydrogen (H), silyl, or a precursor of a good leaving group Z whose conjugate acid (HZ) has a pK$_a$ of less than 30, b is 0, 1 or 2, and each R¹ is a substituent, wherein when b=2, the two R¹ are the same or different and may joint together to form a ring;

the at least one compound of formula (1) comprises at least one compound of formula (1) with Z=H and Y≠H;

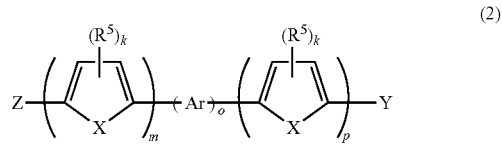

in formula (2),

X is the same or different at each occurrence, and is independently selected from the group consisting of S, O, Se, Te, PR² and NR², wherein R² is selected from the group consisting of hydrogen, and substituted and unsubstituted alkyl, aryl, heteroaryl, alkanoyl, and aryloy groups, Y is hydrogen (H), or a precursor of a good leaving group Y⁻ whose conjugate acid (HY) has a pK$_a$ of less than 30, Z is hydrogen (H), silyl, or a precursor of a good leaving group Z⁻ whose conjugate acid (HZ) has a pK$_a$ of less than 30, Ar is a substituted or unsubstituted, mono- or polynuclear, aryl or heteroaryl ring, m, o and p are each independently an integer equal to or greater than 0, with a proviso that m+p≥1, each k is independently 0, 1 or 2, each R⁵ is a substituent, wherein any two R⁵ on the same ring or on two neighboring rings, or R⁵ and a substituent group on a neighboring Ar ring, may join together to form another ring; and the at least one compound of formula (2) comprises at least one compound of formula (2) with Z=H and Y≠H;

an acid as a polymerization catalyst selected from the group consisting of a protic acid, a polymeric acid, and a non-transitional Lewis acid; and at least one functional component, selected from the group consisting of a solvent, a polymerization retardant, a polymer binder, a dopant, a dielectric layer protection agent, a plasticizer, an impact modifier, and a crosslinking agent, wherein the at least one functional component contains at least a polymerization retardant, and the polymerization retardant comprises a polymer retardant, and the conjugated heteroaromatic polymer contains, as a dopant therefor, the acid as the polymerization catalyst.

7. The electroactive coating of claim 5, which is a part of an antistatic object.

8. The electroactive coating of claim 5, which is a part of an EMI shield, or a part of an infrared, radio frequency and microwave absorbing shield.

9. The electroactive coating of claim 5, which is a part of a transparent electroactive coating layer for a touch screen, or a part of an electroactive coating layer for a touch panel.

10. The electroactive coating of claim 5, which is a part of a flexible electronic device, a part of a flexible electrical conducting connector, or a conducting coating in a membrane switch.

11. The electroactive coating of claim 5, which is a part of a via hole in a circuitry board, or a part of an LED, a field effect transistor, an organic memory device, a solar cell device, a photovoltaic cell, a supercapacitor or a sensor.

12. The electroactive coating of claim 5, which is used as a corrosion-preventing coating for a corrodible material.

13. The electroactive coating of claim 5, which is a part of a smart card, a solar window, a liquid crystal display, an electrochromic display or an electroluminescent display.

14. The electroactive coating of claim 6, which is a part of an antistatic object.

15. The electroactive coating of claim 6, which is a part of an EMI shield, or a part of an infrared, radio frequency and microwave absorbing shield.

16. The electroactive coating of claim 6, which is a part of a transparent electroactive coating layer for a touch screen, or a part of an electroactive coating layer for a touch panel.

17. The electroactive coating of claim 6, which is a part of a flexible electronic device, a part of a flexible electrical conducting connector, or a conducting coating in a membrane switch.

18. The electroactive coating of claim 6, which is a part of a via hole in a circuitry board, or a part of an LED, a field effect transistor, an organic memory device, a solar cell device, a photovoltaic cell, a supercapacitor or a sensor.

19. The electroactive coating of claim 6, which is used as a corrosion-preventing coating for a corrodible material.

20. The electroactive coating of claim 6, which is a part of a smart card, a solar window, a liquid crystal display, an electrochromic display or an electroluminescent display.

21. The capacitor of claim 1, wherein at least one X other than O and $NR^2$ is included in the at least one compound of formula (1) or (2).

22. The electroactive coating of claim 4, wherein at least one X other than O and $NR^2$ is included in the at least one compound of formula (1) or (2).

23. The electroactive coating of claim 6, wherein at least one X other than O and $NR^2$ is included in the at least one compound of formula (1) or (2).

* * * * *